US010686934B2

(12) United States Patent
Coverstone

(10) Patent No.: US 10,686,934 B2
(45) Date of Patent: Jun. 16, 2020

(54) SYSTEMS AND METHODS FOR CONTROLLING A MOBILE DEVICE COVER

(71) Applicant: STAR CO Scientific Technologies Advanced Research Co, LLC, Longview, TX (US)

(72) Inventor: Thomas E. Coverstone, Longview, TX (US)

(73) Assignee: STAR CO SCIENTIFIC TECHNOLOGIES ADVANCED RESEARCH CO, LLC, Longview, TX (US)

( * ) Notice: Subject to any disclaimer, the term of this patent is extended or adjusted under 35 U.S.C. 154(b) by 0 days.

(21) Appl. No.: 16/451,321

(22) Filed: Jun. 25, 2019

(65) Prior Publication Data

US 2019/0342446 A1    Nov. 7, 2019

Related U.S. Application Data

(63) Continuation of application No. 15/973,113, filed on May 7, 2018, now Pat. No. 10,334,098.

(51) Int. Cl.
| | |
|---|---|
| *H04M 1/725* | (2006.01) |
| *H04B 1/3888* | (2015.01) |
| *H04M 1/57* | (2006.01) |
| *H04M 19/04* | (2006.01) |

(52) U.S. Cl.
CPC ...... *H04M 1/72583* (2013.01); *H04B 1/3888* (2013.01); *H04M 1/576* (2013.01); *H04M 1/7253* (2013.01); *H04M 1/72527* (2013.01); *H04M 1/72575* (2013.01); *H04M 19/04* (2013.01)

(58) Field of Classification Search
CPC ..... H04M 1/03; H04M 1/6066; H04W 88/02; H04W 4/80
USPC ........ 455/556.1, 566, 575.1, 575.8; 345/173, 345/204
See application file for complete search history.

(56) References Cited

U.S. PATENT DOCUMENTS

| | | |
|---|---|---|
| 6,608,996 B1 | 8/2003 | Laurikka |
| 6,611,697 B1 | 8/2003 | Ewing |
| 7,065,381 B2 | 6/2006 | Jenkins et al. |
| 7,305,260 B2 | 12/2007 | Vuori |
| 7,353,416 B2 | 4/2008 | Jeansonne et al. |
| 7,400,917 B2 | 7/2008 | Wood et al. |
| 7,466,810 B1 | 12/2008 | Quon et al. |
| 7,769,141 B2 | 8/2010 | Cupal et al. |
| 7,941,725 B2 | 5/2011 | Francillon et al. |
| 8,428,644 B1 | 4/2013 | Harooni |
| 8,583,198 B1 | 11/2013 | Coverstone |

(Continued)

OTHER PUBLICATIONS

PCT, Notification of Transmittal of the International Sear Report and the Written Opinion of the International Searching Authority, or the Declaration, in International Application No. PCT/US2019/030849 dated Jul. 16, 2019 (10 pages).

*Primary Examiner* — Sam Bhattacharya
(74) *Attorney, Agent, or Firm* — McAndrews, Held & Malloy, Ltd.

(57) ABSTRACT

A mobile application running on a host mobile device is used to control the display of notifications, received by the host mobile device, on a mobile device cover. A single button on the mobile device cover is used to display, configure, and navigate through functionality menus of functions provided by the mobile device cover.

16 Claims, 25 Drawing Sheets

(56) References Cited

U.S. PATENT DOCUMENTS

| | | |
|---|---|---|
| 8,588,749 B1 | 11/2013 | Sadhvani |
| 9,300,347 B1 | 3/2016 | Coverstone |
| 9,306,611 B2 | 4/2016 | Coverstone |
| 9,426,266 B1 | 8/2016 | Coverstone |
| 9,584,174 B1 | 2/2017 | Coverstone |
| 2004/0174430 A1 | 9/2004 | Sawahara |
| 2005/0119032 A1 | 6/2005 | Airas |
| 2005/0270872 A1 | 12/2005 | Lin |
| 2006/0240877 A1 | 10/2006 | Filiba et al. |
| 2009/0231248 A1 | 9/2009 | Dorff et al. |
| 2010/0269040 A1 | 10/2010 | Lee |
| 2011/0090626 A1 | 4/2011 | Hoellwarth |
| 2012/0052929 A1 | 3/2012 | Khamvong |
| 2012/0194448 A1 | 8/2012 | Rothkopf |
| 2012/0196580 A1 | 8/2012 | Simmons et al. |
| 2012/0254479 A1 | 10/2012 | Magsuoka |
| 2012/0302294 A1 | 11/2012 | Hammond et al. |
| 2012/0329518 A1 | 12/2012 | Neerag |
| 2013/0027364 A1 | 1/2013 | Kim |
| 2013/0260825 A1 | 10/2013 | Hagenstad |
| 2013/0281169 A1 | 10/2013 | Coverstone |
| 2014/0087789 A1 | 3/2014 | Narendra |
| 2014/0120883 A1 | 5/2014 | Rondeau et al. |
| 2014/0204511 A1 * | 7/2014 | Oh .................. G06F 1/1632 361/679.01 |
| 2015/0158999 A1 | 6/2015 | Small |
| 2015/0229745 A1 | 8/2015 | DeWind |
| 2016/0026375 A1 | 1/2016 | Wu |
| 2016/0048288 A1 | 2/2016 | Lee |
| 2016/0301785 A1 | 10/2016 | Espinoza |
| 2016/0357220 A1 | 12/2016 | Gueorguiev |
| 2017/0007840 A1 | 1/2017 | Benson |
| 2017/0172499 A1 | 6/2017 | Yoo |
| 2017/0213452 A1 | 7/2017 | Brunolli |

* cited by examiner

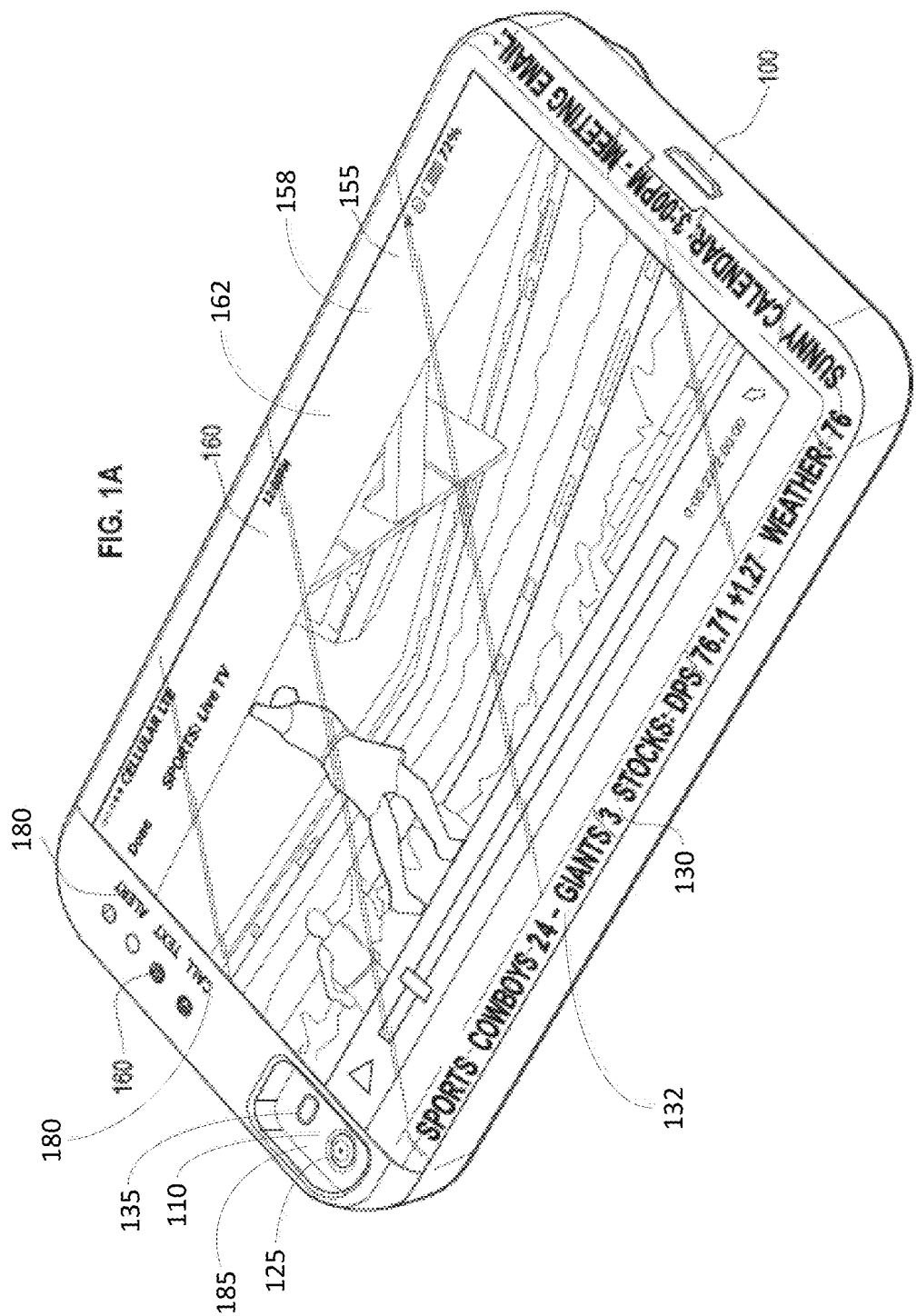

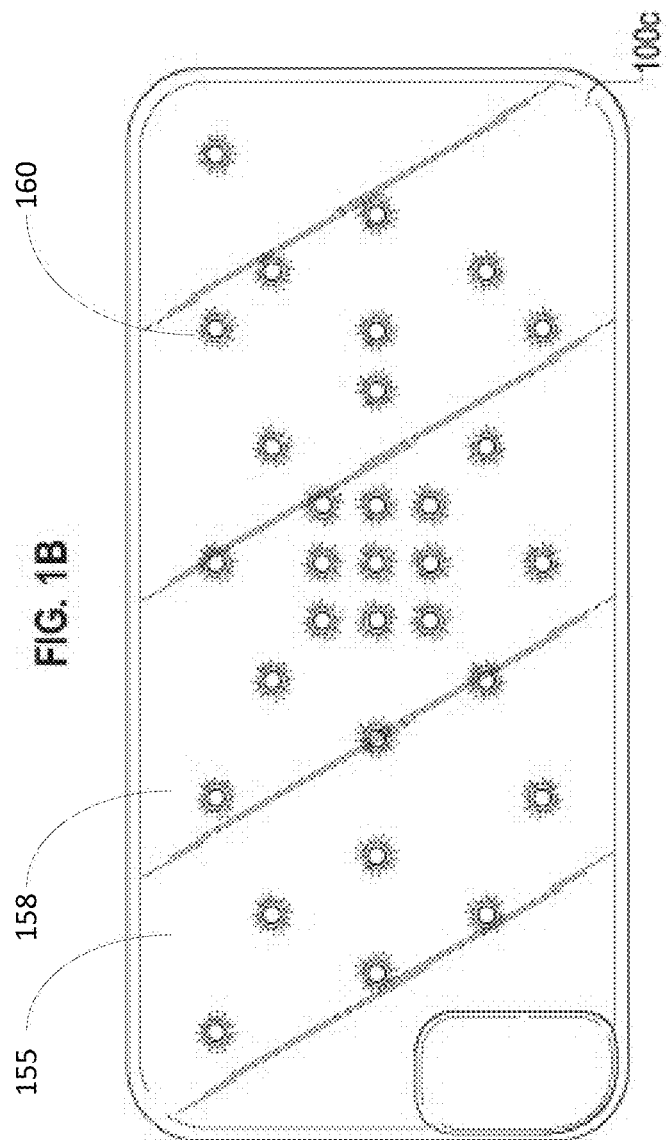

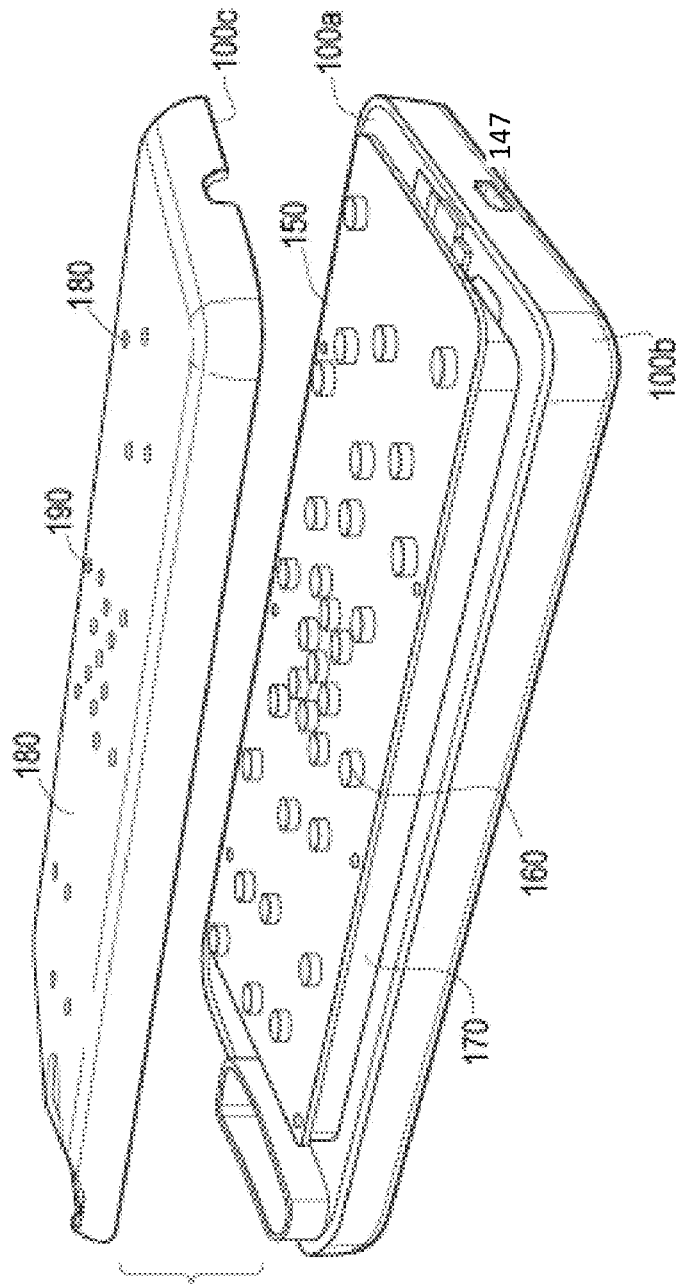

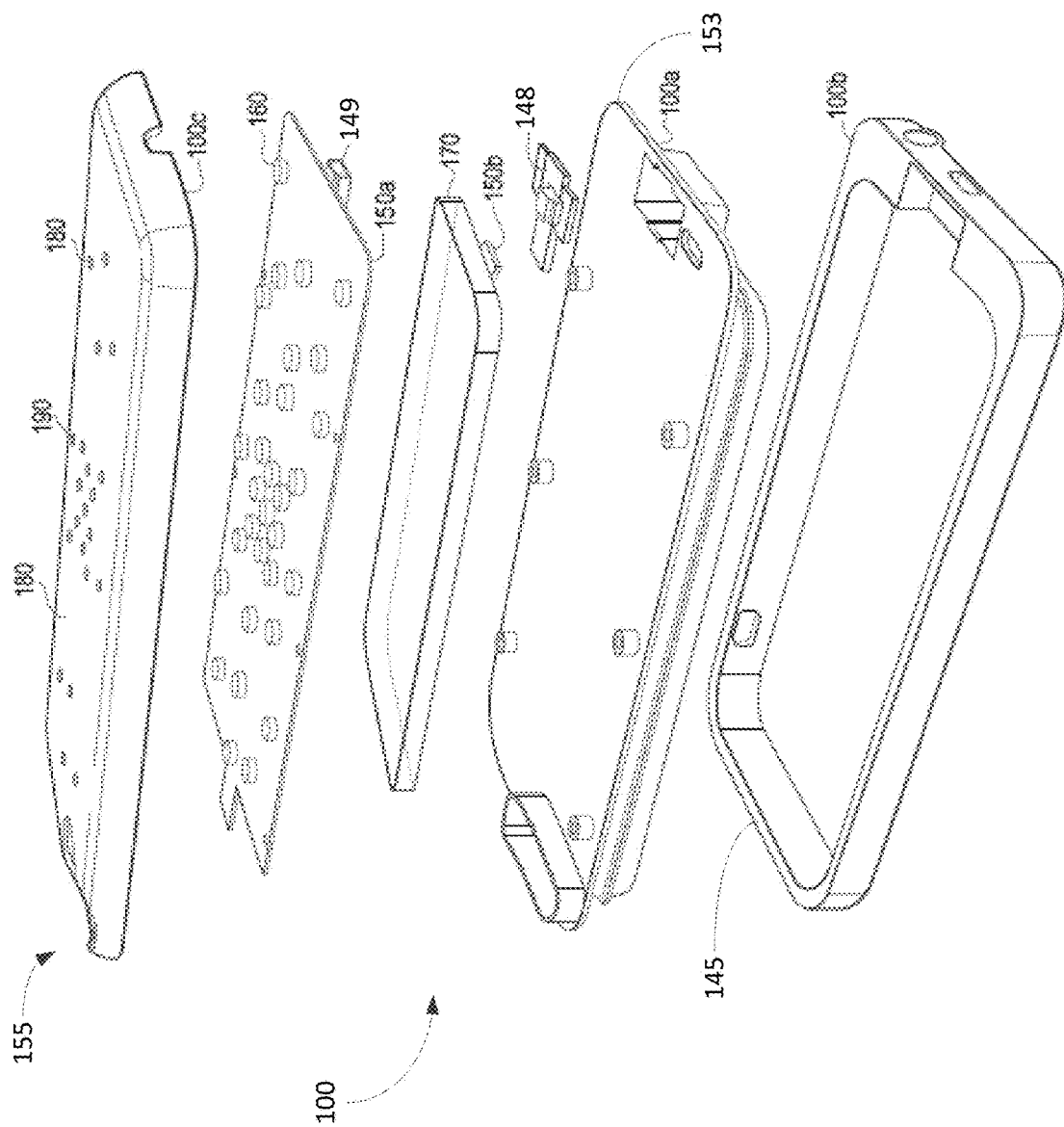

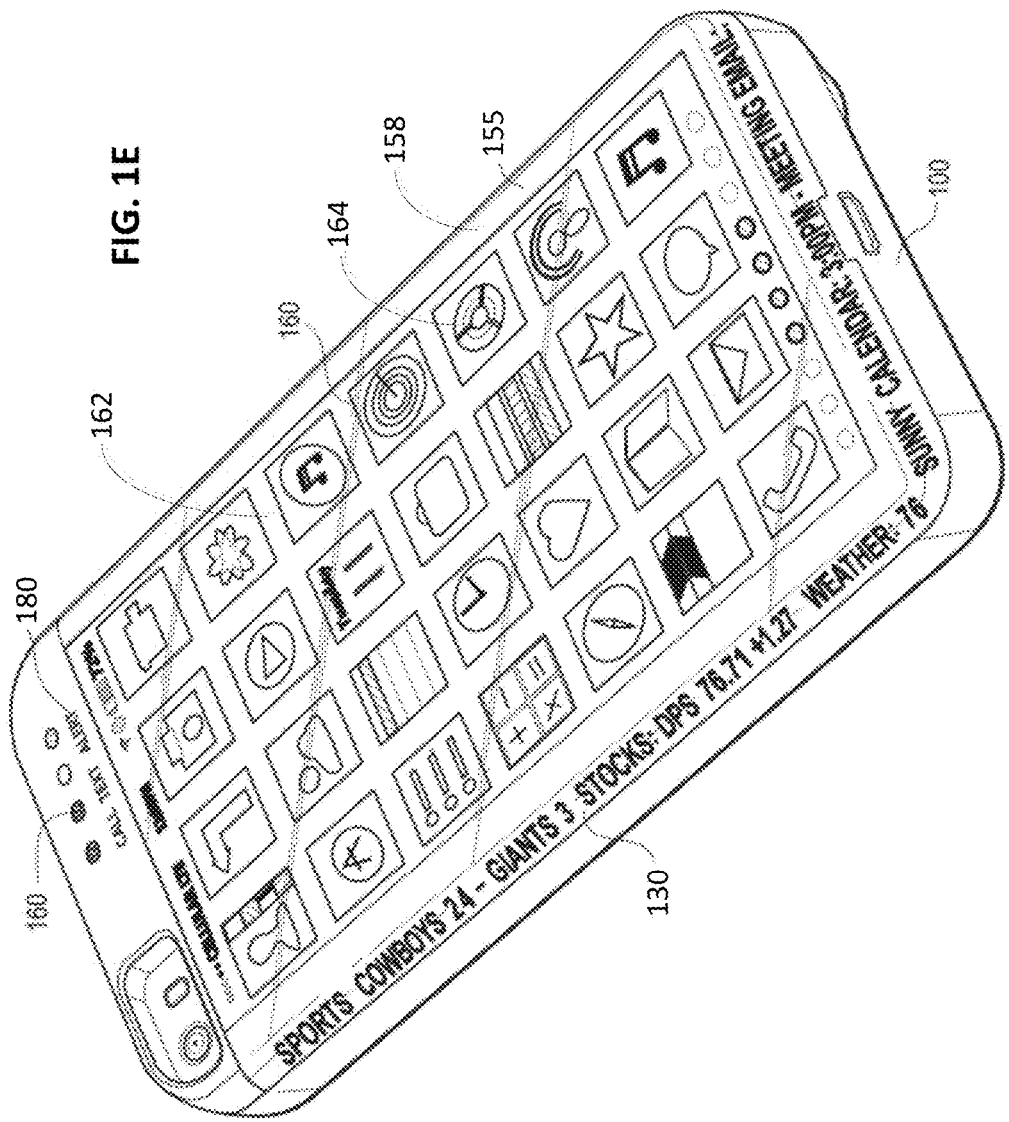

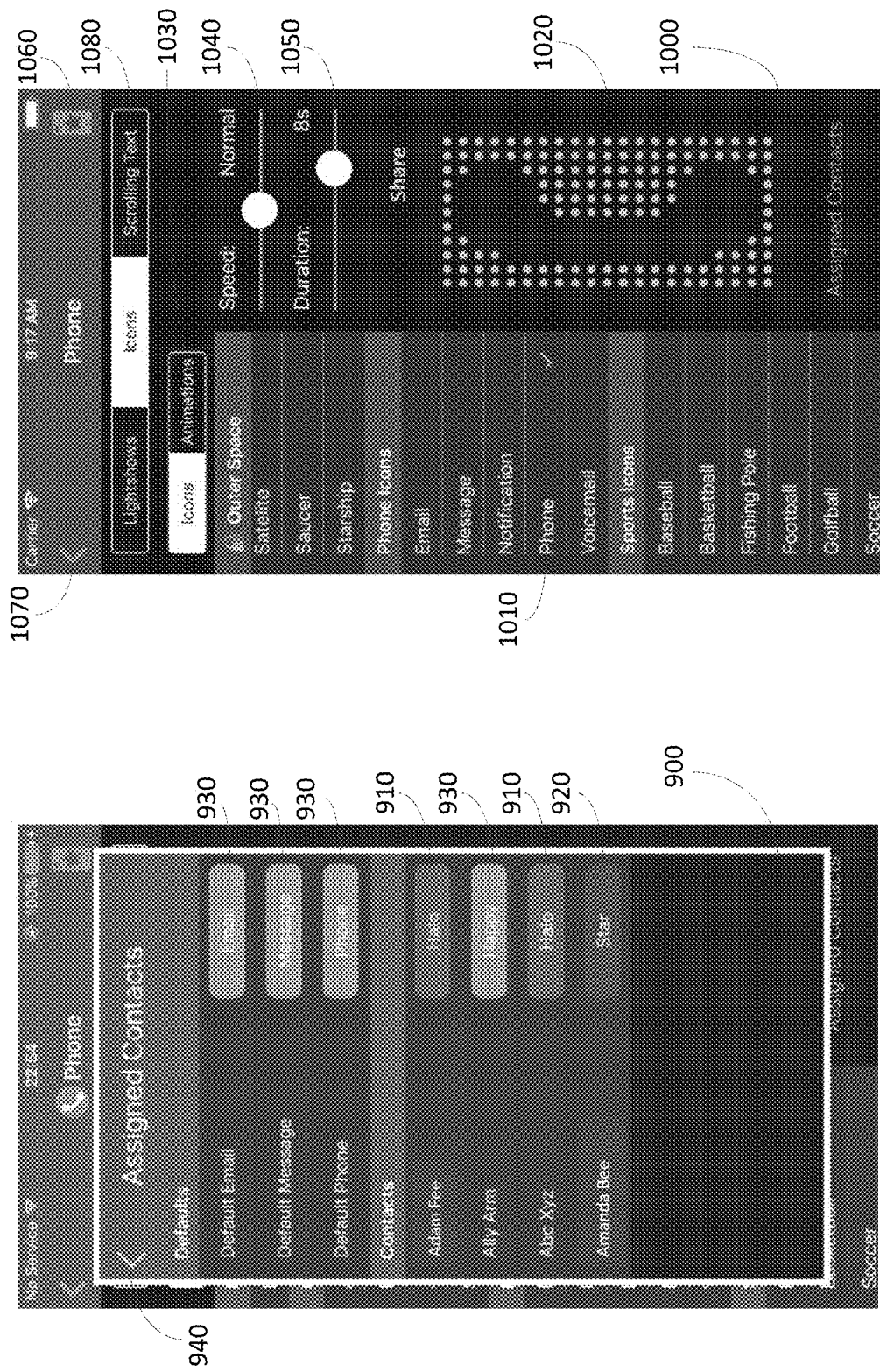

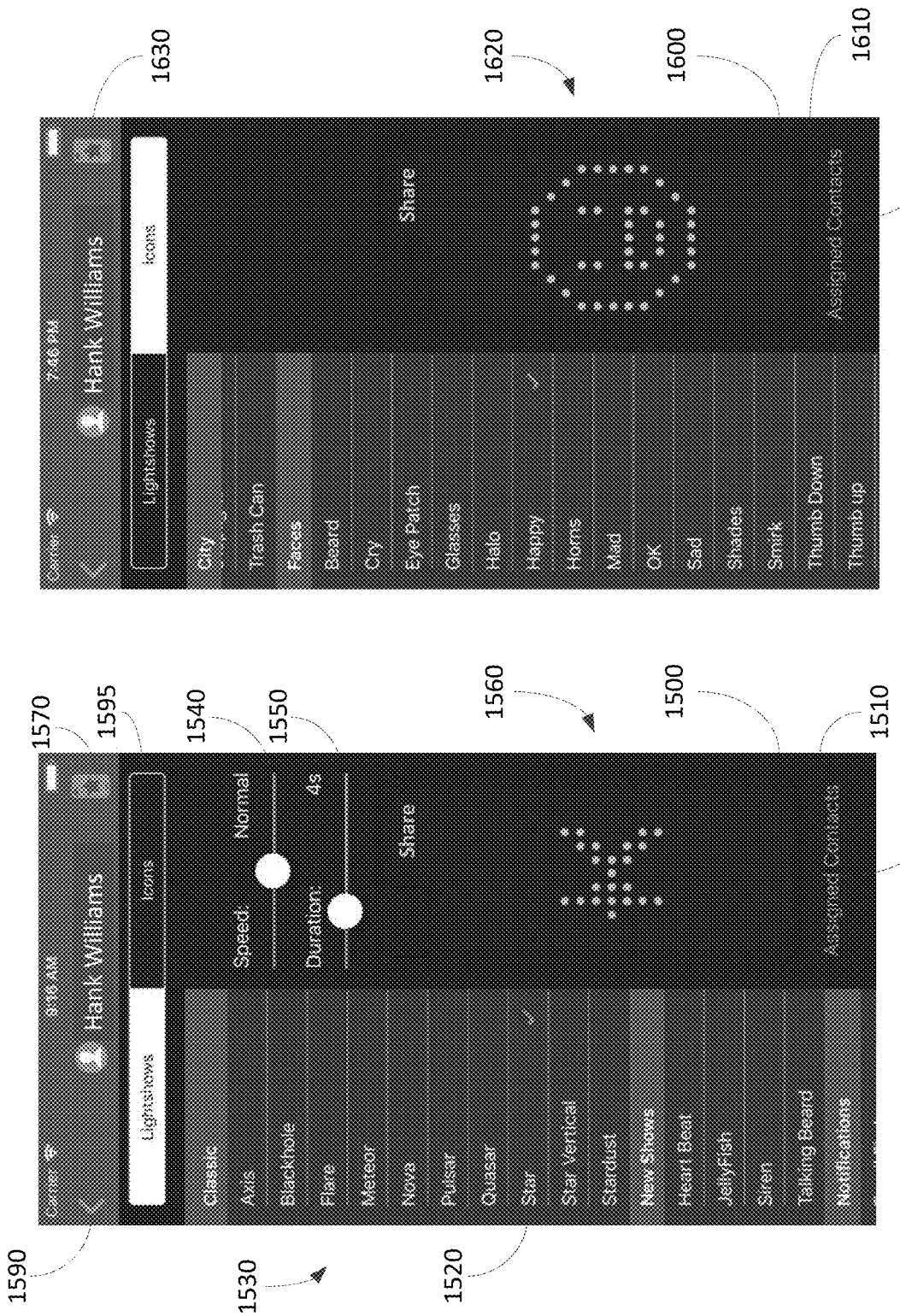

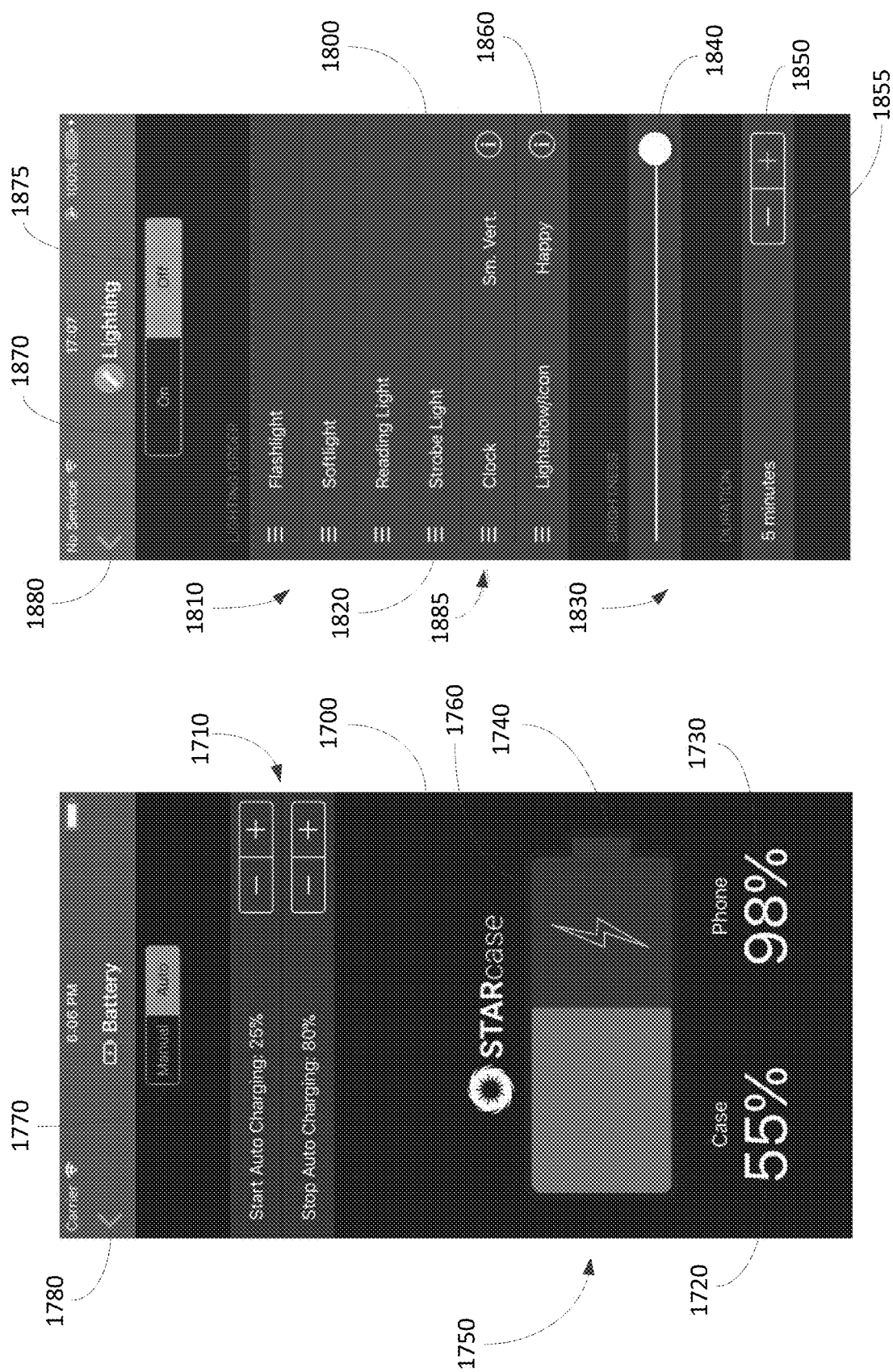

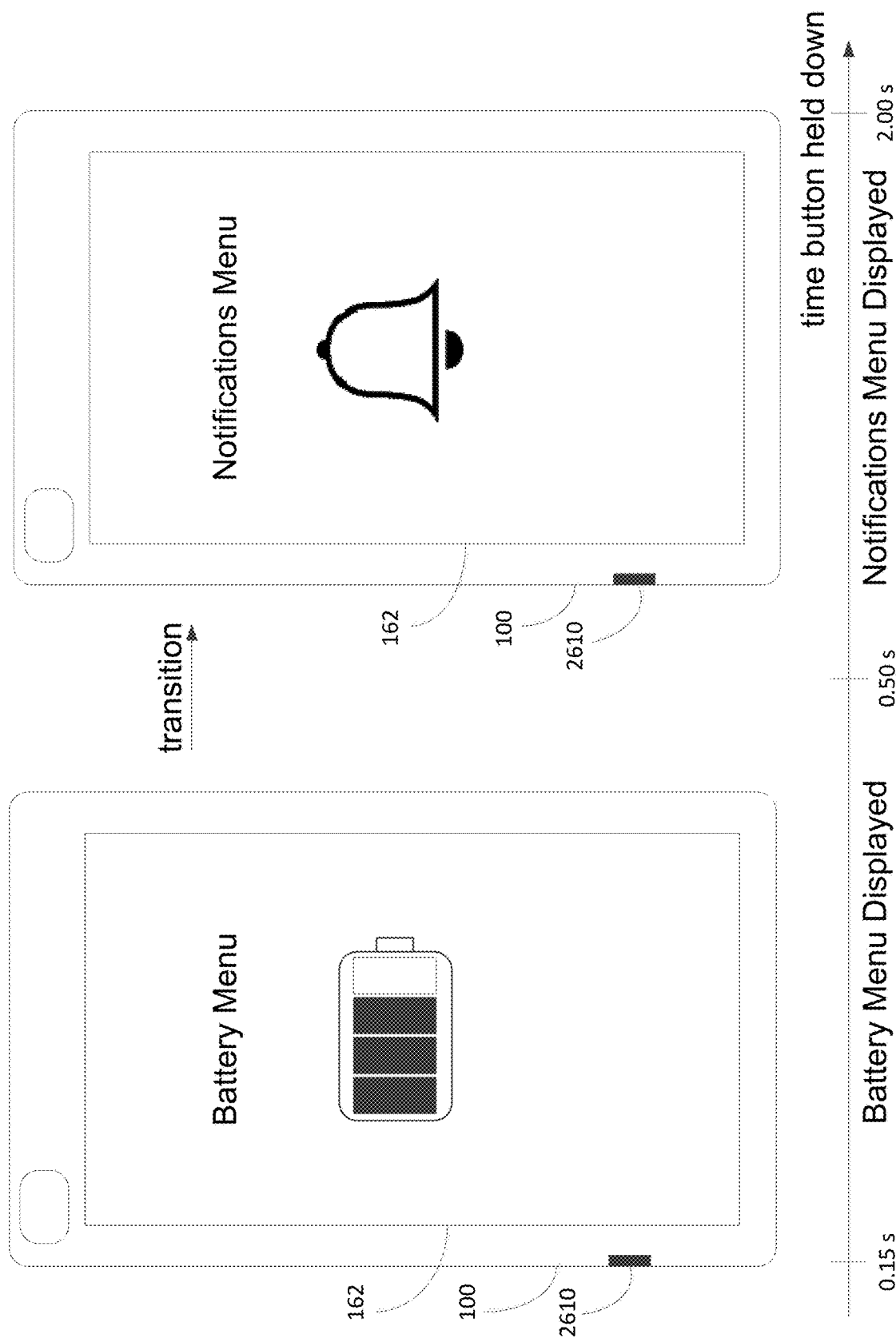

SYSTEMS AND METHODS FOR CONTROLLING A MOBILE DEVICE COVER

CROSS-REFERENCE TO RELATED APPLICATIONS/INCORPORATION BY REFERENCE

The present application is a continuation of U.S. application Ser. No. 15/973,113, filed May 7, 2018. The above-identified application is hereby incorporated herein by reference in its entirety.

FIELD OF THE DISCLOSURE

Certain embodiments of the disclosure relate to systems and methods for controlling a mobile device cover for use with a mobile device.

BACKGROUND OF THE DISCLOSURE

Conventional mobile phone covers are passive accessories to mobile phones. They can have static designs and can offer some measure of protection for the mobile phone.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Some embodiments according to the present disclosure relate to, for example, an active cover for an electronic device or equipment as illustrated by and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 1A shows an exemplary mobile device cover according to an embodiment of the present disclosure.

FIG. 1B shows a top view of an exemplary mobile device cover according to an embodiment of the present disclosure.

FIG. 1C shows a partially exploded side perspective view of an exemplary mobile device cover according to an embodiment of the present disclosure.

FIG. 1D shows an exploded side perspective view of an exemplary mobile device cover according to an embodiment of the present disclosure.

FIG. 1E shows an exemplary mobile device cover according to an embodiment of the present disclosure.

FIG. 9 shows an exemplary assigned contacts page of a mobile application according to an embodiment of the present disclosure.

FIG. 10 shows an exemplary icons page of a mobile application according to an embodiment of the present disclosure.

FIG. 15 shows an exemplary lightshows-for-contacts page of a mobile application according to an embodiment of the present disclosure.

FIG. 16 shows an exemplary icons-for-contacts page of a mobile application according to an embodiment of the present disclosure.

FIG. 17 shows an exemplary battery page of a mobile application according to an embodiment of the present disclosure.

FIG. 18 shows an exemplary lighting page of a mobile application according to an embodiment of the present disclosure.

FIG. 26 shows an exemplary transition in time from an exemplary battery menu to an exemplary notifications menu displayed on a mobile device cover according to an embodiment of the present disclosure.

DETAILED DESCRIPTION OF THE DISCLOSURE

Figure 1G:
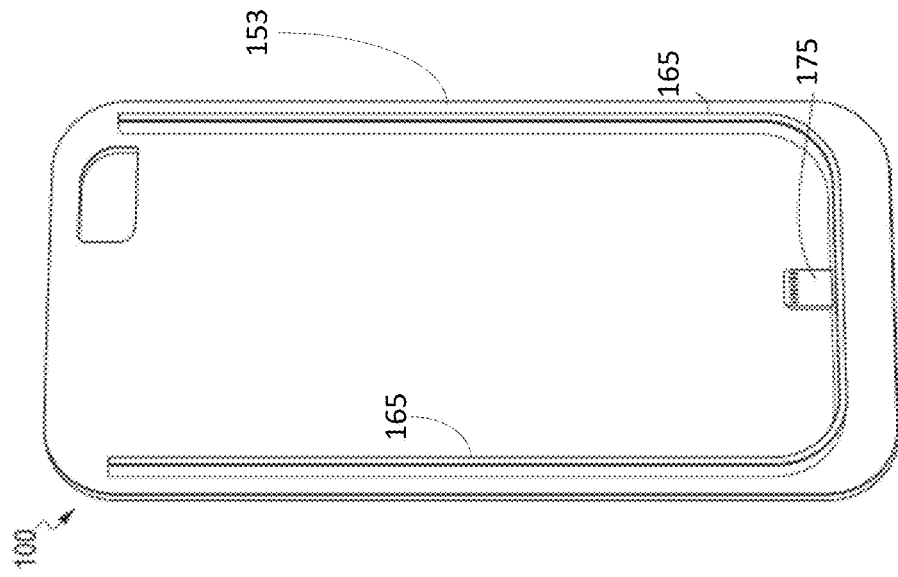
FIG. 1G shows a front side of a middle portion of an exemplary mobile device cover according to an embodiment of the present disclosure.

As utilized herein the terms "circuit" and "circuitry" refer to physical electronic components (i.e., hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of or provide one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

The drawings are of illustrative embodiments. They do not illustrate all embodiments. Other embodiments may be used in addition to or instead of the illustrative embodiments. Details that may be apparent or unnecessary may be omitted to save space or for more effective illustration. Some embodiments may be practiced with additional components or steps and/or without all of the components or steps that are illustrated.

Some embodiments according to the present disclosure provide, for example, suitable logic, circuitry, code, and/or combinations thereof that may be adapted to perform the functions or acts described herein.

Some embodiments according to the present disclosure may relate to, for example, systems and methods that provide an active cover for an electronic device or equipment. Some embodiments contemplate that the active cover and the electronic device or equipment can communicate (e.g., digitally communicate) with each other. Some embodiments contemplate that the active cover and the electronic device or equipment can power themselves, for example, via direct current (DC) power supplies (e.g., rechargeable batteries) and/or via alternating current (AC) power supplies (e.g., wall outlets). Some embodiments further contemplate that one or both of the active cover and the electronic device or equipment can power and/or recharge the other.

Some embodiments according to the present disclosure provide that the active cover can sense when the electronic device is generating an alert or receiving a message, a notification, a call, an email, and/or an indication, and can provide an enhanced alert or indication (e.g., audible and/or visual alert or indication) instead of or in addition to the generated alert or indication of the electronic device. The active cover can provide a visual display (e.g., patterns of lights), display information (e.g., a message, a notification, and/or an indication) received from the electronic device on a graphical user interface (e.g., a touch-sensitive screen), generate a sound (e.g., voice, musical note, audible tone, etc.), and/or vibrate.

Some embodiments according to the present disclosure contemplate that the active cover includes a mobile device cover for use with, for example, a host mobile device (e.g., a cellular handset, a cellular device, a smartphone, a wireless phone, a wireless device, a wireless handset, a multimode phone, a mobile phone compliant with multiple wireless communication standards, a mobile phone equipped with a global positioning system, a multiple-input-multiple-output phone, a wireless communication device, a two-way radio, a communication device with one or more antennas, etc.). The systems and methods disclosed herein can also be used with, for example, tablets, tablet computers, laptops, computers, computing devices, and other devices as well. The systems and methods can be used with stationary devices such as, for example, desktop computers and stationary monitors and/or displays as well. Some embodiments according to the present disclosure that the functionality of the active cover can be directly implemented into the host mobile device, for example, as part of the housing of the host mobile device Some embodiments according to the present disclosure contemplate that, during a host mobile device alert or event, an active mobile device cover can provide its own alert or indication according to signals (e.g., alert signals, indication signals, data, digital signals, etc.) received from the host mobile device. The active mobile device cover may also light in a distinct or random pattern such as, for example, any arrangement, sequence, etc. using lights in which different colors, brightness, intensities, etc. may form shapes, images, icons, emojis, text, alphanumeric text, video, messages, notifications, etc. and can be either static or moving (e.g., animated), for example. The lights may be individual or distinct lighting devices or may be part of or form at least a portion of a screen or a display of the active mobile device cover. In some embodiments, the distinct or random patterns can be illuminated according to the sound, sound signal, alert data, digital signal, and/or other information generated by the host mobile device, and received by the active mobile device cover, for example. In some embodiments, a distinct pattern can be assigned (e.g., manually by a user or automatically) to an associated sound, sound signal, alert, alert signal, digital signal, caller, contact, notification, etc., and/or other information. For example, a distinct pattern can be assigned to a particular ring tone, ring tone signal, contact information (e.g., telephone number, email address, etc.), etc. A random pattern can be assigned to and/or associated with particular sounds, sound signals, alerts, alert signals, digital signals, callers, contacts, notifications, etc., and/or other information. For example, a random pattern or selected pattern can be assigned to a particular ring tone or ring tone signal of the host mobile device, or to a particular source (e.g., telephone number, caller ID, email address, IP address, etc.) of a message, email, call, etc. The random pattern can also be assigned to unassigned identifiers (e.g., telephone numbers, email addresses, IP addresses, source identifiers, etc.) or unrecognized and/or unknown identifiers. In addition to enhancing the look and feel of the outside of the host mobile device, the active mobile device cover provides the user with superior sensory input over the host mobile device alone, and/or protect the host mobile device from drops, scratches, etc.

Some embodiments according to the present disclosure provide a mobile device cover with lights such as light emitting diodes (LEDs) which can be part of and/or form different types of displays (e.g., organic LED (OLED) screens, RGB LED screens, LCD displays, LED indicator lights, touch-sensitive displays, screens, etc.), or other light sources or displays.

Some embodiments according to the present disclosure provide a mobile application that runs on a host mobile device. The mobile application provides a graphical user interface including one or more graphical elements that are used to control the mobile device cover and the host mobile device.

Figure 1F:
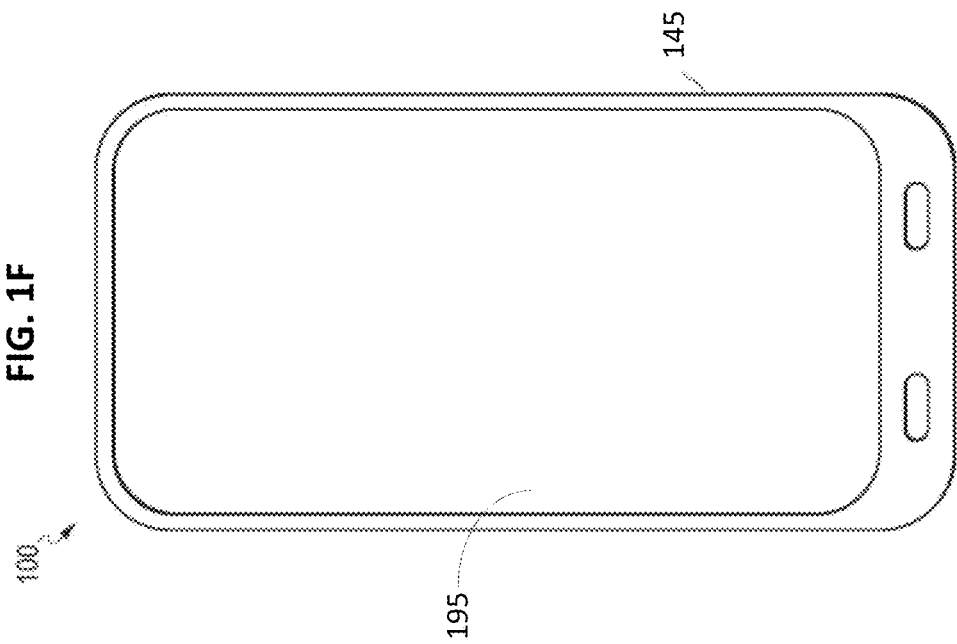
FIG. 1F shows a front side of a front portion of an exemplary mobile device cover according to an embodiment of the present disclosure.

FIG. 1A shows an exemplary mobile device cover 100 according to an embodiment of the present disclosure. As shown in FIG. 1A, the mobile device cover 100 (e.g., a cover, a case, a shell, a protector, etc.) is physically and/or electrically connected to a host mobile device 110. In some embodiments, the mobile device cover 100 is wirelessly connected to the host mobile device 110. In some embodiments according to the present disclosure, the host mobile device 110 (not shown in FIG. 1A except for a camera 125 and a sensor 135 on a back side 185 of the host mobile device 110) may be slipped inside or inserted into the mobile device cover 100, or the mobile device cover 100 can be snapped on or stretched around, at least in part, or otherwise can be fit around, at least in part, the host mobile device 110. FIGS. 1F and 1G show front sides of a front portion 145 and a middle portion 153 of the mobile device cover 100 according to some embodiments of the present disclosure. Referring to FIGS. 1F and 1G, the host mobile device 110 (not shown) can be inserted or locked in between the guides 165 of the middle portion 153. Although some embodiments contemplate a via in the mobile device cover 100 through which a female connector (e.g., a female USB-type connector) of the host mobile device can be accessed, other embodiments contemplate the mobile device cover 100 with a connector 175 (e.g., a lightning connector, a USB-type connector, a data connector, a recharging connector, multi-pin connector, etc.) that mates with the female connector of the host mobile device 110 to provide a connection (e.g., a power connection, a physical connection, an electrical connection, a signal connection, a synchronization connection, etc.). In some embodiments, the connector 175 provides a connection (e.g., electrical connection, data connection, etc.) between circuits in the host mobile device 110 and the mobile device cover 100. For example, the batteries in the host mobile device 110 and the mobile device cover 100 can charge each other via the connector 175 and/or other ports, for example. In some embodiments, the connector 175 is part of a connector assembly that includes a connector element 148, a coupler 149, and a port 147. In addition to or instead of the connector 175, the host mobile device 110 and the mobile device cover 100 can communicate wirelessly (e.g., Bluetooth communication, near field communication (NFC), other radio frequency (RF) communication (e.g., Wi-Fi), infrared communication, etc.) with each other, as mentioned below. In some embodiments, the front side 145 of the mobile device cover 100 can be interlocked with the middle portion 153 of the mobile device cover 100 with the host mobile device 110 there between. As noted before, the main display of the host mobile device 110 may or may not be covered by a transparent material of the mobile device cover 100. In some embodiments, a window 195 is provided in the front portion 145 of the mobile device cover 100 so that the user can directly touch the display (e.g., touch-sensitive screen) of the host mobile device 110.

In some embodiments, the mobile device cover 100 can be an accessory to the host mobile device 110. In some embodiments, the mobile device cover 100 can be an accessory that is operable while separate from the host mobile device 110. The accessory can be in wireless communication with the host mobile device 110. In some embodiments, the mobile device cover 100 and the host mobile device 110 can be controlled via inputs (e.g., buttons, touch-sensitive screens, capacitive touch, sliders, graphical elements on graphical user interfaces, etc.) located on the mobile device cover 100, the host mobile device 110, a mobile application running on the host mobile device 110, a mobile application running on the mobile device case 100, a wired and/or wireless signal sent to the host mobile device 110, a wired and/or wireless signal sent to the mobile device cover 100, etc. The wireless signal can include, for example, Bluetooth signals, IEEE 802.11 signals, wireless local area network (WLAN) signals, wireless personal area network (PAN) signals, Zigbee signals, infrared signals, RF signals, etc. sent to the mobile device cover 100, the host mobile device 110, etc. Accordingly, the mobile device cover 100 and/or the host mobile device 110 include, for example, antennas and circuits (e.g., processors, wireless hardware, transceivers, transmitters, receivers, etc.) to support wireless communication between them 100, 110, and/or between the mobile device cover 100, the host mobile device 110, and/or other wireless devices (e.g., wireless speakers, wireless microphones, wireless headphones, wireless earbuds, wireless displays, base stations, access points, wireless networks, etc.).

Referring to FIG. 1A, a back side 158 of the back portion 155 (e.g., back cover) of an exemplary mobile device cover 100 according to an embodiment of the present disclosure is shown. The back portion 155 of the mobile device cover 100 has lights 160. The lights 160 can form, be a part of, and/or illuminate a screen (e.g., a main screen or display, indicator lights, light patterns, etc.) and can emit different colors with different intensities at different times. The lights 160 can also form, be a part of, and/or illuminate another screen 132 or an extension of the main screen along an edge 130 (e.g., a beveled edge, a chamfered edge, a side, a lateral side, a border of the screen 162, etc.) of the mobile device cover 100. Further, the light 160 can illuminate beads 180 with different colors as indicator lights, for example. The beads 180 can be colored or not, and can be at least partially transparent, for example. In some instances, the beads 180 can take the configuration of letters, numbers, and/or shapes and can be flat or raised in structure. The beads 180 can be used as part of a Braille reader system, for example. In some instances, the beads 180 can include, for example, LED or light covers. In some examples, the beads 180 can be flat transparent plastic windows that can be positioned over lights 160. In such an instance, the beads 180 can be colored, and/or the lights 160 can provide color through colorless, transparent beads 180. In some embodiments, the beads 180 can be disposed throughout the back cover 155 of the mobile device cover 100 so that the beads 180 can be illuminated in particular colors, patterns, and/or intensities at particular times and/or in response to certain alerts or other information (e.g., digital signals, digital data, analog signals, etc.) received from the host mobile device 110.

In some embodiments, when the host mobile device 110 and the mobile device cover 100 are operatively coupled, the mobile device cover 100 can provide indicators and/or data (e.g., digital data, video data, streaming data, etc.) from the host mobile device 110 to the user via output interfaces (e.g., lights, screens, speakers, etc.) of the mobile device cover 100. In some embodiments, when the host mobile device 110 and the mobile device cover 100 are operatively coupled, the mobile device cover 100 and the host mobile device 110 are in one- or two-way digital and/or analog data communication. The mobile device cover 100 can display information, data, and/or content (e.g., multimedia content, video content, streaming content, social media content, scrolling text, etc.) received from the host mobile device 110. Further, the host mobile device 110 can display information, data, and/or content received from the mobile device cover 100. The host mobile device 110 and/or the mobile device cover 100 can cause information, data, and/or content to be displayed on the host mobile device 110. Further, the host mobile device 110 and/or the mobile device cover 100 can cause information, data, and/or content to be displayed on the mobile device cover 100. The information, data, and/or content can be received from the host mobile device 110, the mobile device cover 100, another device, and/or a third party, such as a mobile application, a website, etc. FIG. 1E shows an embodiment of the mobile device cover 100 in which the back cover 1030 includes the lights 160 forming a touch-screen display 162 that can be similar or the same as the display that can be shown on the main display of the host mobile device 110. Thus, for example, the touch-screen display 162 of the mobile device cover 100 can operate in a same or similar manner (e.g., same or similar graphical user interface, graphical elements, touch-and-feel, etc.) as the main display of the host mobile device 110. The touch-screen display 162 of the mobile device cover 100 can provide the same or similar array of icons 164 as the main display of the host mobile device 110, for example, or can be completely different. This can be useful, for example, if the display of the host mobile device 110 is being used for another purpose (e.g., playing a video, taking a call, work use, personal use, etc.), but the user wants to access other mobile applications. For example, the host mobile device 110 can be used to operate a GPS navigation application, while the mobile device cover 100 is being used to watch a movie or to stream video. Further, since the host mobile device 110 and the mobile device cover 100 can be in wireless communication, the mobile device cover 100 can be detached from the host mobile device 110 while watching the movie or streaming video, for example.

Referring to FIG. 1A, when the host mobile device 110 is receiving an incoming call, for example, beads 180 that form the word "CALL" on the back cover 155 of the mobile device cover 100 can be illuminated, caused to flicker, flash, etc. If a calendar event notification is activated or received by the host mobile device 110, for example, the beads 180 that form the word "ALERT" can be illuminated, caused to flicker, flash, etc. If a text message is received by the host mobile device 110, for example, the beads 180 that form the word "TEXT" can be illuminated, caused to flicker, flash, etc. These events and others (e.g., social media postings or messages, changes in sports scores, news items, emails, SMS messages, etc.) can also be displayed on the touch-screen display 162. The beads 180 can also be illuminated different colors and with different intensities to indicate different degrees of urgency. For example, if the alert is urgent (e.g., an email sent with "high importance"), the beads 180 that form the word "ALERT" can flash red and/or with increased intensity to indicate urgency. In another example, if the incoming call or text message is not from an important person, which can be designated via programming, user settings, user configurations, user preferences, etc., the corresponding beads 180 can be illuminated a dim blue. In some embodiments, the mobile device cover 100 can determine the identity of the caller or the message sender via electrical signals, sound signals, acoustic signals, wireless signals, digital signals, etc. received from the host mobile device 110. In some embodiments, the host mobile device 110 can determine the identity of the caller or the message sender and send a data signal corresponding to and/or identifying the caller or the message sender to the mobile device cover 100 as well as other information (e.g., voice mail, text message, indications of importance, etc.). Further, the user may be notified as to the name, number, email address, etc. of the sender or source of the alert, text, email, or other notification via the lights 160, beads 180, or other output devices (e.g., speakers, screens, vibration, etc.) of the mobile device cover 100.

In some embodiments, the mobile device cover 100 can be configured to provide video (e.g., live streaming video, streaming video, stored video, etc.) and/or other information (e.g., digital data, messages, news, alerts, etc.) on one or more screens. The video can be provided via the host mobile device 110, for example, or some other source to which the mobile device cover 100 and/or the host mobile device 110 is operatively coupled. For example, the mobile device cover 100 can have its own wireless link with an access point (e.g., an IEEE 802.11-compliant access point) or a base station (e.g., a cellular base station, a portable base station, etc.) from which to download media content. The mobile device cover 100 can also include memory storage (e.g., non-transitory memory storage, solid state memory storage, removable memory sticks, disks, cards, etc.) on which resides media content for playing or displaying on the screen of the mobile device cover 100 and/or the host mobile device 110. The video can be, for example, stored on the host mobile device 110 or can be streamed via a wireless link (e.g., cellular link, WIFI link, IEEE 802.11 link, wireless local area network (WLAN) link, Bluetooth link, RF link, etc.) with a content provider or a third party application. In some embodiments, closed captioning or subtitles can scroll along the main screen 162 which can include and/or be supplemented with one or more screens 132 on one or more edges 130 of the mobile device cover 100. In some embodiments, the mobile device cover 100 can be configured to provide an alert of a received video message and to play the video message on the screen 162 of the mobile device cover 100. The screen 162 of the mobile device cover 100 can be substantially independent or can substantially mirror the screen of the host mobile device 110. The screens 162, 132 can be incorporated into the housing of the electronic device.

Further, the screen 162 of the mobile device cover 100 can be touch-sensitive and employ graphical elements of a graphical user interface. Thus, for example, a user input via the touch-sensitive screen 162 of the mobile device cover 100 can provide a user input to the host mobile device 110 and/or the mobile device cover 100. The screen of the mobile device cover 100 can be set up to substantially mirror the screen of the host mobile device 110 or to operate independently of the screen of the host mobile device 110. Content or material can also be displayed on the mobile device cover 100 and/or the host mobile device 110 that is from an application on the host mobile device 110, for example. For example, if the user has access to a sports application running on the host mobile device 110 that shows sports videos, television channels, movie channels, or live events on the host mobile device 110, the video may be displayed on the host mobile device 110 and/or the mobile device cover 100.

Some embodiments provide that digital signals can be received or provided by the host mobile device 110 and forwarded to the mobile device cover 100 for storage, processing, and/or output (e.g., on a display, lights, a speaker, a vibrating mechanism, etc.). For example, in addition to multimedia data, some embodiments provide that data (e.g., alphanumeric data, indicators, control data, source information, etc.) can be received or provided by the host mobile device 110 and forwarded to the mobile device cover 100 for storage, processing, and/or output. For example, the edge screen 132 (or any other light 160 screen on the mobile device cover 100) can be configured to scroll information relating to news, sports, live or recorded events or movies, stocks, weather, calendar events, text messages, alerts, email, social media messages (e.g., messages or posts from mobile applications or websites such as Facebook, Twitter, Snapchat, Instagram, etc.), etc. In some embodiments, the information can scroll around one or more edge screens 132 around the mobile device cover 100. In some embodiments, the host mobile device 110 can be set to periodically receive or retrieve sports data (e.g., scores, news items, etc.) or other types of data. The data can be from, for example, websites, mobile applications, other host mobile devices, etc. The host mobile device 110 can send sports data, for example, to the mobile device cover 100; and the mobile device cover 100 can display or scroll the data across the edge screen 132 of the mobile device cover 100 or display or scroll on the screen 162. In some embodiments, the edge screen 132 can be touch-sensitive, thereby allowing the user to tap or swipe an email notification and read a scrolling email on the edge screen 132 or on another display (e.g., the main display 162 on the back cover 155) of the mobile device cover 100. In some embodiments, the data can flow across the edge screen 132 in response to a finger sweeping motion along the edge touch-sensitive screen 132. In one embodiment, an incoming text message can be indicated by the beads 180 forming the word "TEXT" being illuminated by lights 160, the sender of the incoming text can be displayed on the edge screen 132, and the text of the text message can be displayed on the main screen 162 on the back cover 155 of the mobile device cover 100. In one embodiment, alphanumeric letters are displayed on the screen on the back cover 155 and the edge 130, either simultaneously or independently, indicating that a text message has been received and possibly displaying the sender's name, the sender's associated icon, the sender's associated image (e.g., sender's picture), the sender's subject, the sender's header, the sender's body text, the sender's partial or full text, etc. A text or email icon can be displayed instead of the words TEXT, for example. The display can also be a series of LEDs forming a grid to accommodate lights show, scrolling text, etc.

The edge screen 132 can be configured to scroll completely or partially around the mobile device cover 100 and/or along one or more of its edges 130. In some embodiments, the edge 130 can be segmented or partitioned so that the right edge portion is reserved for a first subject (e.g., stocks), the left edge portion is reserved for a second subject (e.g., sports), the bottom edge portion is reserved for a third subject (e.g., email), and the top edge portion is reserved for a fourth subject (e.g., calendar items, alerts, etc.), for example. Within each segment, the edge screen 132 can scroll the data. In some embodiments, the user can program and/or select which subject is displayed on each individual segment on the mobile device cover 100. In some embodiments, the user can program the mobile device cover 100 so that it decides on which segment to display a particular subject (e.g., incoming call, incoming text, incoming email, incoming message, mobile device notification, mobile device accessory notifications, music or other audio notifications, social media notifications, etc.).

FIG. 1B shows a top view of an exemplary mobile device cover 100 according to an embodiment of the present disclosure. FIG. 1C shows a partially exploded side perspective view of an exemplary mobile device cover 100 according to an embodiment of the present disclosure.

Referring to FIGS. 1B and 1C, the mobile device cover 100 can be adapted, for example, to provide physical vias (e.g., access openings and windows) through which various input interfaces and output interfaces of the host mobile device 110 can be accessed without detaching the mobile device cover 100 from the host mobile device 110. In some embodiments, the mobile device cover 100 may provide a physical opening to access a display, a camera, a button, a control, other input/output (I/O) interfaces, etc. of the host mobile device 110. In some embodiments, the mobile device cover 100 does not cover the main display of the host mobile device 110 when the mobile device cover 110 is attached to the host mobile device 110. In some embodiments, the mobile device cover 100 may provide a transparent or partially transparent cover portion, for example, over a display or other portions of the host mobile device 110. The transparent cover portion can be made of materials that, for example, do not interfere with the operation of any of the touch screens, speakers, and/or buttons of the host mobile device 110. In some embodiments, the materials can be substantially transparent to wireless communication links used by the host mobile device 110 and/or the mobile device cover 100. The transparent cover portion may also protect areas of the host mobile device 110 such as touch screens from scratches or other damage.

Some embodiments according to the present disclosure may provide that the mobile device cover 100 is made of one or more of the following materials: silicone, rubber, metal, plastic, polymers, polycarbonates, composites, cloth, metal, wood, acrylic, glass, plexiglass, or other materials. The cover material may be, at least in part, opaque or transparent. The cover material may assist a user in gripping the host mobile device 110 and may protect the host mobile device 110. The cover material may be, for example, one or more of the following: shock resistant, shock proof, shatter proof, shatter resistant, dust resistant, dust proof, water resistant, water proof, etc. In some embodiments, the mobile device cover 100 may be made up of multiple pieces (e.g., portions 100a, 100b, 100c, one or more printed circuit boards, housings, etc.), as shown in FIGS. 1B and 1C. In some embodiments, the multiple pieces of the mobile device cover 100 interlock together to house, become the back panel of the host mobile device 110, and/or to connect (e.g., physically and/or electrically connect, snap, interlock, etc.) to the host mobile device 110.

Referring to FIGS. 1B and 1C, the mobile device cover 100 can include, for example, circuitry 150 and lights 160 disposed on one or more printed circuit boards. In some embodiments, the circuitry 150 can include one or more of the following: one or more processors, one or more non-transitory memories, signal processors, light control circuitry, light drive circuitry, battery recharging circuitry, battery control circuitry, display control circuitry, sensors, input interface circuitry, output interface circuitry, digital-to-analog converters, analog-to-digital converters, wired transceivers, wireless transceivers, input/output ports, input/output interfaces, and antennas. The one or more non-transitory memories can be configured to store, for example, data (e.g., input data, data received from the host mobile device 110, stored reference data, stored configuration data, stored personal data, etc.) and processor-executable instructions or code for use with the one or more processors. The circuitry 150 can be connected, for example, to and/or can include the lights 160. Some embodiments provide that the lights can include one or more of the following: LEDs, flexible active-matrix OLEDs (AMOLEDs), OLEDs, phosphor-based LEDs, white LEDs (WLEDs), multi-color WLEDs, semiconductor LEDs, other types of LEDs, LCDs, LCD touch screens, electroluminescence, pixel displays, etc., and can be arranged or used in a specific pattern, array, sequence, etc. Some embodiments provide that the lights can be raised or provide bumpy surfaces suitable for use in a Braille system. Various components and/or elements of the circuitry 150 can be connected to each other through one or more buses, for example.

The mobile device cover 100 can also include, for example, a battery 170 (e.g., a rechargeable battery, a "watch" battery, etc.) that can be used to power, for example, the circuitry 150, the lights 160, and any other circuitry or components in the mobile device cover 100 and/or the host mobile device 110. The battery 170 can also be used to power the host mobile device 110 and/or to recharge a battery in the host mobile device 110. In some embodiments, the mobile device cover 100 does not have a battery and instead can be powered by the host mobile device 110. Some embodiments according to the present disclosure provide that the battery 170 can be rechargeable or not rechargeable. If not rechargeable, the battery 170 can be replaced. Some embodiments of the battery 170 include, for example, a lithium battery, an alkaline battery, a silver-oxide battery, nickel cadmium battery, nickel metal hydride battery, lithium ion battery, lithium ion polymer battery, etc. If rechargeable, then the battery 170 can be recharged, for example, by drawing energy from one or more interfaces of the host mobile device 110 (e.g., an audio port, an earphone jack, a docking port (e.g., a USB-type port, a lightning connector port, a power and signaling connection port, etc.), a wireless charging pad, etc.). The battery 170 can also be recharged by drawing energy separate from or independent of the host mobile device 110. Similarly, a rechargeable battery of the host mobile device 110 can be charged through one or more interfaces of the host mobile device 110 that are electrically or wirelessly connected to the mobile device cover 100. The rechargeable battery of the host mobile device 110 can also be recharged by drawing energy separate from or independent of the host mobile device 110.

For example, independent of whether the mobile device cover 100 is connected to the host mobile device 110, the mobile device cover 100 can be separately plugged into a wall outlet or wirelessly charged at a wireless charging station. The mobile device cover 100 can also be charged by plugging it into a computer, a charger bank, a generator, etc. via a USB-type connection, for example. The battery 170 of the mobile device cover 100 can be charged by a piezoelectric battery charger, for example. In some embodiments, the piezoelectric battery charger can convert force (e.g., caused by pressure, movements, mechanical forces, etc.) into electrical energy for use by the battery 170. Some embodiments contemplate converting other types of energy (e.g., sound energy, light energy, electromagnetic energy, magnetic energy, thermal energy, moving air, wireless energy, etc.) into electrical energy to charge the battery 170. In some embodiments, the mobile device cover 100 can utilize charging methods such as conductive and inductive charging.

In some embodiments, the battery 170 of the mobile device cover 100 can also be recharged when the host mobile device 110 is wirelessly or wiredly connected to a power source (e.g., AC and/or DC power source). For example, the battery 170 of the mobile device cover 100 can be recharged when the host mobile device 110 is connected to a wall outlet, for example, such as when a docking port of the host mobile device 110 is connected to a wall outlet. The battery 170 may receive energy directly from the wall outlet (e.g., via connecting the mobile device cover 100 directly to the wall outlet) or indirectly from the wall outlet through the host mobile device 110. In addition, the battery 170 may receive energy when a docking port or some other interface of the host mobile device 110 is connected to a computer while electrically or wirelessly connected to the mobile device cover 100. Some embodiments according to the present disclosure contemplate that the circuitry 150 receives power from the host mobile device 110 without using the battery 170 or in combination with the battery 170. Thus, some embodiments according to the present disclosure might not have a dedicated battery as part of the mobile device cover 100, or might use the battery 170 as a back-up power source.

In some embodiments, just as the battery 170 of the mobile device cover 100 can draw on energy from the host mobile device 110, the battery of the host mobile device 110 can draw on energy from the mobile device cover 100 to recharge the battery of the host mobile device 110 or to supplement power to the host mobile device 110. For example, as rechargeable batteries age, they are less capable of fully powering the main processor on the host mobile device 110. The aging batteries have reduced full charge capacity and provide less power, voltage, and/or current during normal operation. As a result, some processors (e.g., central processor, graphics processor, general processor, dedicate processor, etc.) will enter a power-save mode in which processor speed (e.g., clock speed) and/or load capacity (e.g., peak load) are reduced to conserve power and/or energy which is detrimental to performance and/or inconvenient to the user. In such a situation, the host mobile device 110 can supplement the power and capacity of its own battery with the battery 170 of the mobile device cover 100, thereby avoiding the power-save mode of the processor of the host mobile device 110 or vice versa. Accordingly, the processors in the host mobile device 110 can continue to operate at normal operation speeds and load capacities. Further, by supplementing power and capacity of the host mobile device 100, the battery 170 of the mobile device cover and the battery of the host mobile device 110 can be used to power a turbo mode in the processor of the host mobile device 110 or vice versa. For example, in turbo mode, the processor (e.g., a central processor, a graphics processor, a general processor, a dedicated processor, etc.) of the host mobile device 110 can operate at one or more of the following: a higher voltage, a higher current, a higher power, a higher load capacity, and/or a higher clock speed than during normal operation. During turbo mode, the host mobile device 110 and/or the mobile device cover 100 can operate with greater performance and can perform more processor-intensive applications.

In some embodiments, when the host mobile device 110 is electrically connected to the mobile device cover 100 (e.g., when the host mobile device 110 has been inserted into the mobile device cover 110) and the mobile device cover 100 is plugged into a wall outlet, for example, the battery 170 of the mobile device cover 100 and the battery of the host mobile device 110 charge at the same time. In some embodiments, the battery of the host mobile device 110 charges without a decrease in charge speed even when the host mobile device 110 and the mobile device cover 100 are charged at the same time via the electrical connection (e.g., via a port 147) of the mobile device cover 100 to the wall plug, for example.

FIG. 1D shows an exploded side perspective view of an exemplary mobile device cover 100 according to an embodiment of the present disclosure. In some embodiments, the circuitry 150 can be embedded in the mobile device cover 100. In some embodiments, the circuitry 150 may include, for example, one or more circuit boards 150a including, for example, one or more of the following: one or more processors, circuit elements or components, an integrated circuit, an integrated circuit chip, a system on a chip, etc. The circuitry 150 may also include, for example, one or more sensors 150b (e.g., an audio sensor, a signal sensor, an optical sensor, a wireless signal sensor, a wireless receiver, a wireless transceiver, an electrical sensor, a power sensor, a battery sensor, an electromagnetic sensor, a vibration sensor, gyroscope sensor, iris scanner, fingerprint sensor, accelerometer, proximity sensor, barometer, hear rate sensor, a biometric sensor, etc.). Components 150a and 150b can be part of the same circuit board or can be part of separate circuit boards, for example, that are connected to form, in part, the mobile device cover 100. A sensor can be part of components 150a, 150b, or both. In some embodiments, the mobile device cover 100 can include multiple circuit boards or multiple-layered circuit boards.

Figure 2:
FIG. 2 shows an exemplary circuit arrangement according to an embodiment of the present disclosure.

FIG. 2 illustrates an exemplary circuit arrangement according to an embodiment of the present disclosure. Referring to FIG. 2, a simplified block diagram is shown of the circuitry 150. The circuitry 150 may include one or more of the following: a processor 200, a memory 210, an I/O device 220, a bus 230, driver circuitry 240, and lights 160. The processor 200, the memory 210, the I/O device 220, the driver circuitry 240, and the lights 160 can be coupled to each other via one or more buses 230. The circuitry 150 can include more or less than one processor 200, one memory 210, one I/O device 220, one bus 230, one driver circuit 240, and two lights 160 as illustrated in FIG. 2. Thus, some embodiments contemplate employing different numbers of various elements of the circuitry 150.

The driver circuitry 240 can include, for example, one or more of the following: light drivers, LED drivers, shift registers, constant current supply, constant voltage supply, switching supply, FET amplifier, BJT amplifier, etc. In addition, some embodiments according to the present disclosure contemplate using a plurality of sensors, processors, memories, and/or driver circuits. Some embodiments provide that the driver circuitry 240 can be part of the processor 200 and, in some embodiments, can take the place of the processor 200. Some embodiments provide that the driver circuitry 240 and other circuitry can be incorporated into a system on a chip (SOC). In some embodiments, the driver circuitry 240 can be configured to control any amount or arrangement of similar or different lights 160, including a full display (e.g., a touch-sensitive screen, LED screen, etc.). In some embodiments, the driver circuitry 240 can be configured to power any number or arrangement of similar or different lights 160.

The I/O device 220 can include, for example, one or more of the following: an input device (e.g., a button), a touch-screen display, a wired and/or wireless transceiver (e.g., cellular transceiver, Bluetooth transceiver, WLAN transceiver, etc.), a wired and/or wireless transmitter, a wired and/or wireless receiver, an antenna, a speaker, a microphone, an I/O port (e.g., earbud port, earphone port, microphone port, speaker port, etc.), an I/O interface, data connector port, power connector port, wired and/or wireless communication device, GPS receiver, a network interface, etc.

The processor 200 can include, for example, one or more of the following: a general processor, a central processing unit, a digital filter, a microprocessor, a digital processor, a digital signal processor, a microcontroller, a programmable array logic device, a complex programmable logic device, a field-programmable gate array and an application specific integrated circuit (ASIC), and a memory (e.g., a cache). Code, instructions, software, firmware, and/or data including, for example, a mobile application may be processed and/or executed by the processor 200 to perform any of the operations, functions, and/or features described in the present disclosure. Further, the code, instructions, software, firmware, and/or data including, for example, the mobile application may be stored in the processor 200 and/or the memory 210. The code, instructions, software, firmware, and/or data can be automatically or manually updated, upgraded, modified, replaced, overwritten, supplemented, etc. via a wireless or wired connection.

The memory 210 can include, for example, one or more of the following: a non-transitory memory, a non-transitory processor readable medium, a non-transitory computer readable medium, a read only memory (ROM), a random access memory (RAM), DRAM, EPROM, EEPROM, F-RAM, FIFO, NVRAM, SRAM, a cache, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory 210 may be configured to store code, instructions, software, firmware, and data for use by the processor 200 and may be external, internal, or both with respect to the processor 200. In some embodiments, the memory 210 also stores a mobile application, settings, parameters, values, lightshows, icons (e.g., icons, emojis, graphical elements, etc.), animations, scrolling text, etc. Further, the code, instructions, software, firmware, and/or data can be automatically or manually updated, upgraded, modified, replaced, overwritten, supplemented, etc. via a wireless or wired connection.

Some embodiments provide that a mobile application can be downloaded onto the host mobile device 110 to provide a graphical user interface that can be used, for example, to control the mobile device cover 100. The mobile application can run on the host mobile device 110 and/or the mobile device cover 100. The graphical user interface can be on the host mobile device 110 and/or the mobile device cover 100. Further, the mobile application can be automatically or manually updated, upgraded, modified, replaced, overwritten, supplemented, etc. via a wireless or wired connection.

Figure 4:
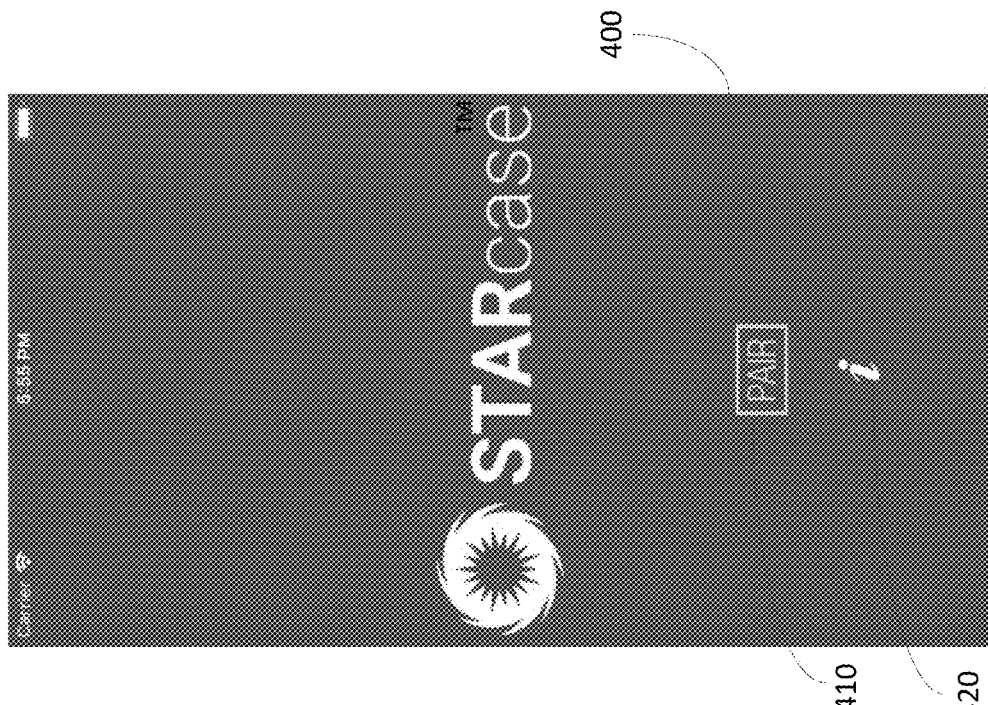
FIG. 4 shows an exemplary front page of a mobile application according to an embodiment of the present disclosure.
Figure 3:
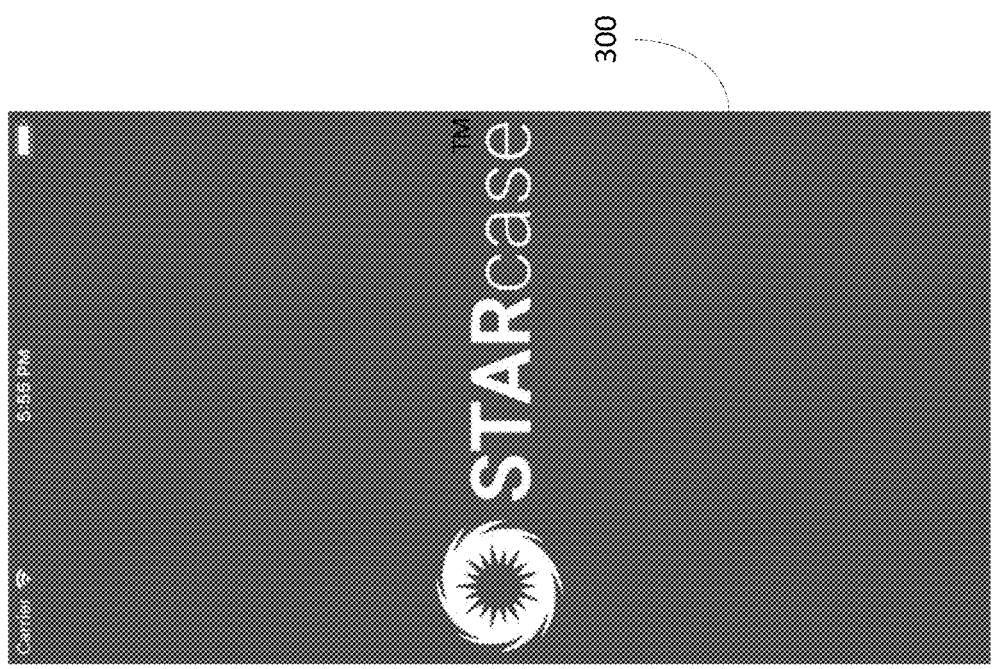
FIG. 3 shows an exemplary launch screen page of a mobile application according to an embodiment of the present disclosure.
Figures 5, 6:
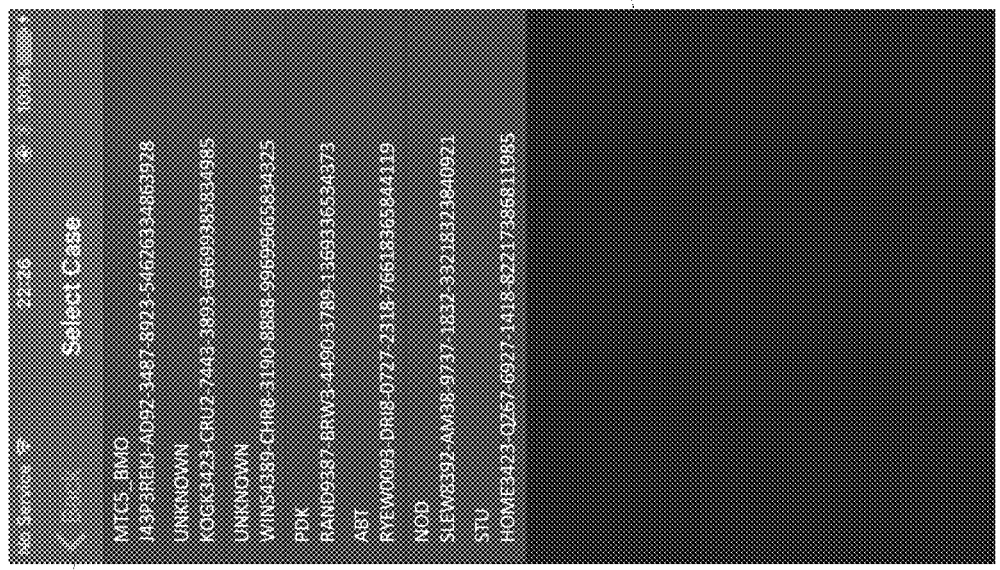
FIG. 5 shows an exemplary connection page of a mobile application according to an embodiment of the present disclosure.
FIG. 6 shows an exemplary instructions page of a mobile application according to an embodiment of the present disclosure.
Figures 7, 8:
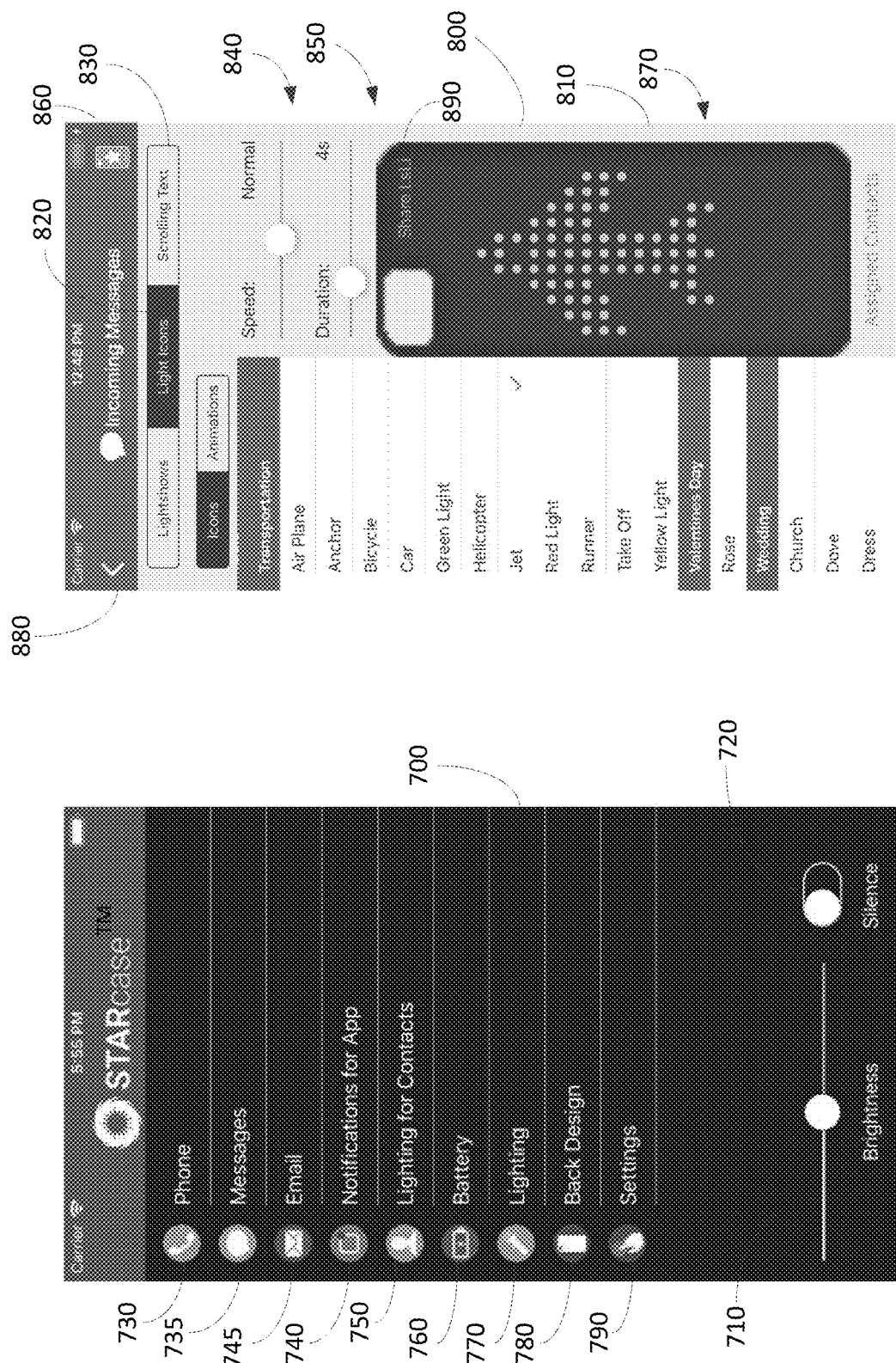
FIG. 7 shows an exemplary home page of a mobile application according to an embodiment of the present disclosure.
FIG. 8 shows an exemplary lightshows page of a mobile application according to an embodiment of the present disclosure.

FIGS. 3 and 4 show an exemplary launch screen page 300 and an exemplary front page 400 according to an embodiment of the present disclosure. The mobile application can be represented as an icon (e.g., a graphical element of a graphical user interface) on the display (e.g., screen) of the host mobile device 110 and/or the mobile device cover 100. When the icon is selected, the mobile application runs on the host mobile device 110 (and/or the mobile device cover 100) and a launch page 300 as shown in FIG. 3 is displayed by the host mobile device 110 (and/or the mobile device cover 100). Subsequently, a front page 400 as shown in FIG. 4 is displayed. While the front page 400 is being displayed, the mobile application attempts to wirelessly and/or wiredly connect the host mobile device 110 and the mobile device cover 100 according to an embodiment of the present disclosure. In one embodiment, the mobile application attempts to wirelessly pair the mobile device cover 100 and the host mobile device 110, which are both Bluetooth-enabled. If the mobile application is not successful in making a connection (e.g., a connection between previously paired devices 100, 110), then a connection page 500 is opened as shown in FIG. 5, or an alternative connection method can be established via, for example, a USB-type connection, WiFi connection, Bluetooth connection, Zigbee connection, etc. If a successful connection is made, then an exemplary home page 700 is opened as shown in FIG. 7. If the connection is lost, then the mobile application opens the front page 400 or the connection page 500.

By selecting the pair icon 410 (e.g., graphical button) shown in FIG. 4, an exemplary connection page 500 according to an embodiment of the present disclosure as shown in FIG. 5 is opened that allows for configuring wireless and/or network connections. The connection page 500 enables the user to select a device for pairing (e.g., a mobile device cover 100) and/or a network for connection. The list 520 of devices can be refreshed by a user gesture such as a swipe, for example, otherwise, the list is refreshed periodically. In some embodiments, selecting a particular device such as a mobile device cover 100, for example, initiates a verification process such as a pin verification process, for example. After a prompt from the mobile application, entry of the correct pin (e.g., supplied by the mobile device cover 100) within a particular time limit or by a particular number of attempts causes the mobile application to open the home page 700 shown in FIG. 7. Configuring of the mobile application and/or the mobile device cover 100 can occur based on a selection or an input of a particular model number or particular type of mobile device cover 100. Incorrect entry of the pin number within the particular time limit or after a particular number of failed attempts causes the mobile application to open the front page 400 or the connection page 500. By selecting a back icon 510, for example, the mobile application navigates to the front page 400, the connection page 500, or a previous page.

By selecting the information icon 420 (e.g., an "i" icon) in FIG. 4, an exemplary instructions page 600 according to an embodiment of the present disclosure as shown in FIG. 6 is opened which provides descriptions and helpful information about various items being displayed, for example, on a push button or element selectable menu. By tapping or toggling the back icon 610 (e.g., back graphical button), for example, by making a gesture on the screen (e.g., swiping left to right on the screen), or by moving the mobile device cover 100 and/or host mobile device 110 in a particular way, the home page 700 as shown in FIG. 7 or a previous page can be opened.

FIG. 7 shows an exemplary home page 700 according to an embodiment of the present disclosure. In some embodiments, upon successful connection and pairing, the mobile application displays a home page 700 as shown in FIG. 7. The home page 700 provides a graphical user interface by which the user can further navigate the mobile application. Referring to FIG. 7, the home page 700 includes icons or hyperlinks to open, for example, a phone page, a messages page, an email page, a notifications-for-applications page, a lighting-for-contacts page, a battery page, a lighting page, a back design page, and a settings page. In addition, the home page 700 provides for controlling a brightness (e.g., via a brightness slider 710) of a display and/or a volume for a speaker for the mobile device cover 100 and/or the host mobile device 110. In some embodiments, the home page 700 provides an icon 720 (e.g., a graphical element) that can be toggled on or off as to whether to display incoming notifications on the mobile device cover 100, for example.

In some embodiments, the mobile application enables the user with the ability to set up a particular lightshow, a particular icon (e.g., an icon, an emoji, a custom-designed graphical element), and/or a particular text (e.g., scrolling text) to be displayed for a particular type of communication (e.g., phone, message, email. etc.), a particular contact, and/or a particular type of communication (e.g., phone, message, email, etc.) for that particular contact on a contact list stored in the host mobile device 110 and/or the mobile device cover 100. The mobile application also enables the user to customize the selected lightshow, icon, text, etc.

By selecting the phone icon 730 on the home page 700, a phone page 800 according to an embodiment of the present disclosure is opened as shown in FIG. 8. In some embodiments, a messages page and an email page are opened by selecting the message icon 735 and the email icon 745, respectively, of the home page 700 and operate in a similar manner as the phone page 800. In some embodiments, after the phone icon 730 is selected, a lightshows page 810 (e.g., for phone notifications) is first shown for the phone page 800 as in FIG. 8; however, other selectable options including an icons page and a scrolling text page can also be opened by selecting the corresponding icons 820, 830 (e.g., graphical buttons or tabs). Referring to FIG. 8, the lightshows page 810 provides one or more graphical elements on a graphical user interface that enable the user to select a particular lightshow (e.g., flare) from a list of lightshows that can be assigned, for example, to a particular contact. Parameters for the lightshows are also selected. For example, a speed and a duration are set (e.g., via graphical sliders 840, 850 as shown in FIG. 8) for the selected lightshow, which includes animation, for example. Other adjustable or selectable parameters can include light intensity, colors, size, pulsing, bursting, etc. The selected lightshow with any selected particular lightshow parameters is assigned to a particular contact (e.g., phone contact, phone number, etc.), and this information is sent to the mobile device cover 100, for example. The assignments are stored in the mobile device cover 100, the host mobile device 110, and/or the mobile application. The lightshows page 810 provides an icon 860 (e.g., a preview-on-case icon) that, when selected, causes the mobile device cover 100 to demonstrate the currently selected lightshow according to the selected lightshow parameters on the LEDs (or other lights or lighting devices) and/or on one or more screens of the mobile device cover 100. In some embodiments, the lightshows page 810 can provide an icon (e.g., a preview-in-the-mobile application icon) or can automatically display in a portion 870 of the lightshows page 810 or in a separate page of the mobile application, a preview of the selected lightshow according to the set lightshow parameters. For example, the mobile application can provide a separate preview page or preview section 870 as shown in FIG. 8 of the lightshows page 810 that shows the selected lightshow according to the selected settings (e.g., with any selected animation at a particular speed for a particular duration) on an image of the mobile device cover 100 according to the selected model and/or other characteristics (e.g., a blue back design or color). The preview in the mobile application can provide the user with a preview of the selected lightshow and lightshow options (e.g., on the host mobile device 110) without necessarily demonstrating the lightshow on the LEDs and/or screen of the mobile device cover 100. However, the preview in the mobile application (e.g., on the host mobile device 110) can also be played concurrently with or separately from a preview on the case (e.g., a preview using the LEDs and/or screen of the mobile device cover 100). In some embodiments, the lightshows page 810 provides an icon that, when selected, enables a user to download or purchase (e.g., as part of an in-application purchases page) additional lightshows or features. In some embodiments, clicking on a share icon enables the user to share the particular lightshow, icon, and/or scrolling text with others (e.g., friends, selected individuals, contacts, etc.). The sharing can be facilitated via a wired and/or wireless communication or transfer, a text, an email, a social media post or communication, etc. as text, a file, a graphics interchange format (GIF) file, an image, a video, a picture, a file stored in camera roll, etc. Selecting the back button 880 (or other actions such as backwards swipes) brings back the home page 700 or a previous page. Selecting (e.g., tapping or some other user input) on the assigned contacts button or link 890 causes an assigned contacts page 900 to open as shown in FIG. 9.

FIG. 9 shows an exemplary assigned contacts page 900 according to an embodiment of the present disclosure. The assigned contacts page 900 enables the user to view and select a particular lightshow (e.g., light pattern, lightshow, animation, etc.) for assignment (e.g., assignment or re-assignment). In some embodiments, a lightshow includes a series of images that are displayed on the mobile device cover 100 and/or the mobile application. The assigned contacts page 900 also enables the user to view the currently assigned lightshow for a particular notification category (e.g., email, message, phone, etc.). Further, the assigned contacts page 900 can also identify duplicate lightshow assignments. Colors or other indicators enable the user to easily see duplicate assignments. Referring to FIG. 9, the Halo lightshow, which is shown as a red button 910, is assigned both to contacts Adam Fee and Abc Xyz. The particular colors used are merely exemplary. The Star lightshow, which is shown as a blue button 920, is uniquely assigned to Amanda Bee. The email icon, the message icon, the phone icon, and the Happy icon, which are shown as green buttons 930, indicate uniquely assigned icons for emails generally, messages, phone calls generally, and Ally Arm. Selecting the back button 940 (or other actions such as backwards swipes) brings back a previous page (e.g., the lightshows page 810).

Figure 25C:
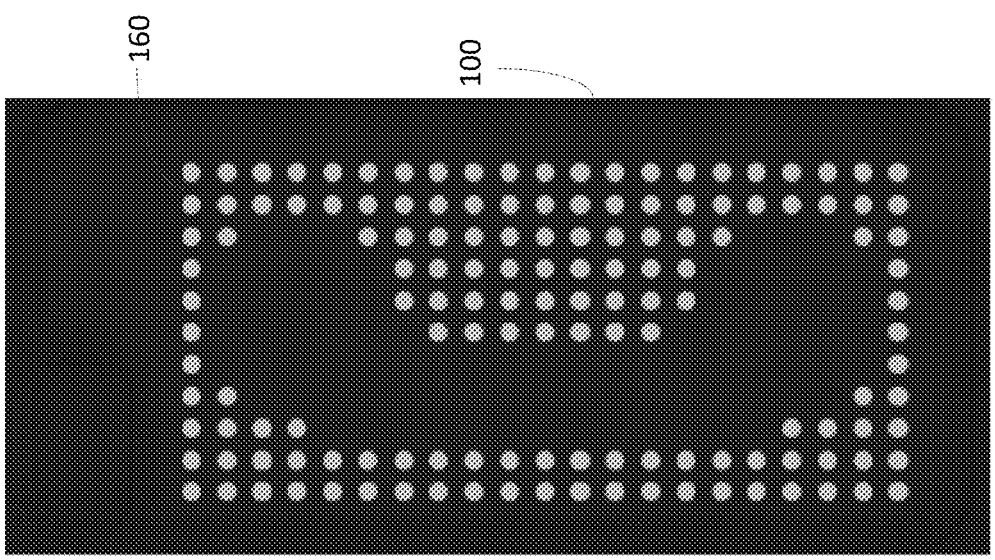
FIG. 25C shows an exemplary preview on a mobile device cover according to an embodiment of the present disclosure.
Figure 25B:
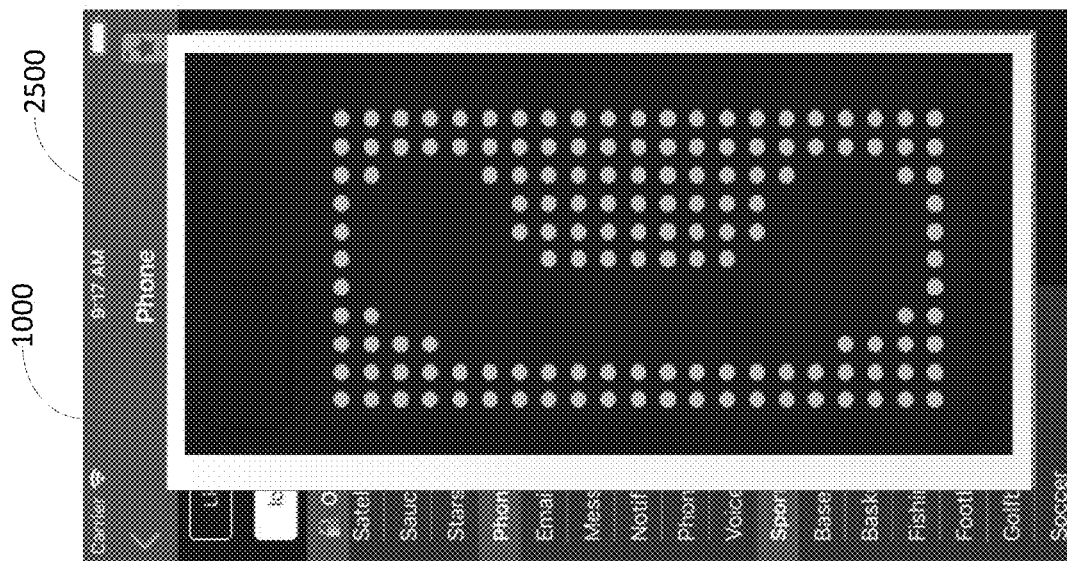
FIG. 25B shows an exemplary preview page of a mobile application according to an embodiment of the present disclosure.
Figure 25A:
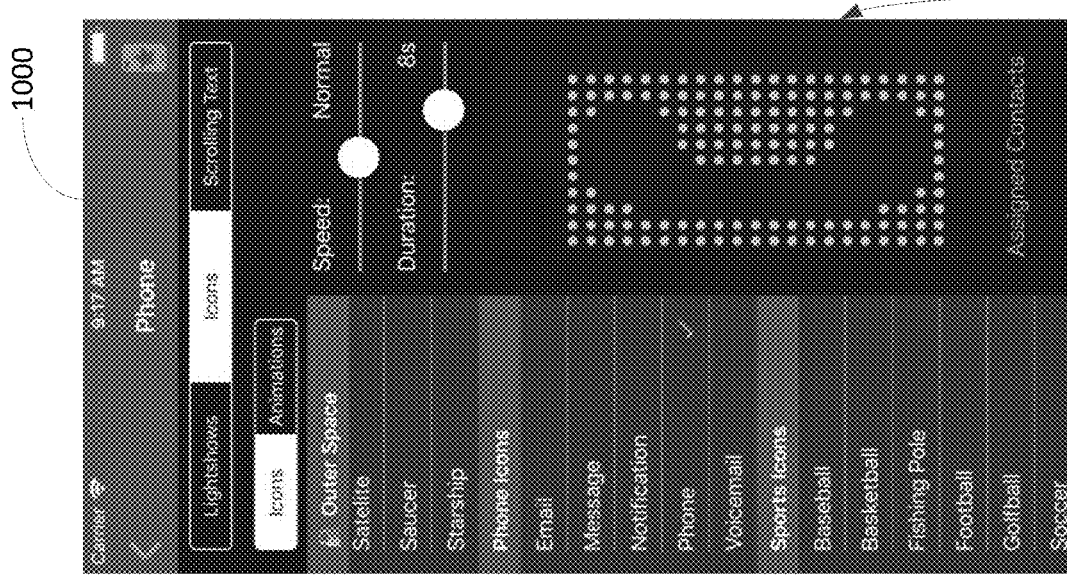
FIG. 25A shows an exemplary preview as a portion of an exemplary page of a mobile application according to an embodiment of the present disclosure.

Selecting the icons button 820 (e.g., graphical tab) at the top of the phone page 800 shown in FIG. 8 opens an exemplary icons page 1000 according to an embodiment of the present disclosure as shown in FIG. 10. The icons page 800 of the mobile application enables the user to select a particular icon, icon parameters, and/or animation for assignment (e.g., assignment or re-assignment). Selecting a particular icon such as, for example, the phone icon 1010 as shown in FIG. 10, causes the mobile application to display the phone icon as it would look when displayed on the mobile device cover 100 on a portion 1020 of the page 1000 or on a separate page. Information relating to the selection of the phone icon 1010 including any icon parameters and assignments is sent to the mobile device cover 100. By selecting the animations button 1030, different types of animations are listed for application to the phone icon, for example. In some embodiments, the list includes only those animations that are applicable for the selected icon. In some embodiments, the animations can include moving across the screen, pulsating, bursting, dynamically changing colors, rotating, dynamically changing in size, etc. Selecting an icon parameter such as, for example, an animation, causes the mobile application to display the selected icon on a portion 1020 of the display according to the selected animations and/or icon parameters, and to send the icon-related information to the mobile device cover 100. Icon parameters such as a speed and a duration are set (e.g., via graphical sliders 1040, 1050 as shown in FIG. 10) for the selected icon and the applied animation. In some embodiments, the icons page 1000 provides an icon 1060 (e.g., a preview-on-case icon) that, when selected, causes the mobile device cover 100 to demonstrate the currently selected icon according to the selected parameters and/or animations on the mobile device cover 100 as shown in FIG. 25C, for example. For example, the lights 160 (e.g., LEDs, screens, etc.) of the mobile device cover 100 light up according to the selected icon, animations, and/or parameters to preview the response of the mobile device cover 100 for the particular assignment (e.g., a particular contact, type of communication, type of notification, alert, etc.). In some embodiments, the icons page 1000 can provide an icon (e.g., a preview-in-the-mobile application icon) or can automatically display in a portion 1020 of the icons page 1000 as in FIG. 10 or 25A, or in a separate page 2500 of the mobile application as in FIG. 25B, a preview of the selected lightshow according to the set lightshow parameters. The preview changes as the user makes changes. The mobile application can also provide a separate preview page 2500 as shown in FIG. 25B or preview section 1020 as shown in FIG. 10 (or FIG. 25A) of the icons page 1000 that shows the selected icon according to the selected settings (e.g., with any selected animation at a particular speed for a particular duration) on an image of the mobile device cover 100 according to the selected model and/or other characteristics (e.g., a blue back design or color). The preview in the mobile application can provide the user with a preview of the selected icon and icon options (e.g., on the host mobile device 110) without necessarily demonstrating the icon on the LEDs and/or screen of the mobile device cover 100. However, the preview in the mobile application (e.g., on the host mobile device 110) can also be played concurrently with a preview on the case (e.g., a preview using the LEDs and/or screen of the mobile device cover 100) as shown in FIG. 25C. In some embodiments, clicking on a share icon enables the user to share the particular lightshow, icon, and/or scrolling text with others (e.g., friends, selected individuals, contacts, etc.). The sharing can be facilitated via a wired and/or wireless communication or transfer, a text, an email, a social media post or communication, etc. as text, a file, a graphics interchange format (GIF) file, an image, a video, a picture, a file stored in camera roll, etc. Selecting the back button 880 (or other actions such as backwards swipes) brings back the home page 700 or a previous page.

In some embodiments, the icons page 1000 provides an icon that, when selected, enables a user to download or purchase (e.g., as part of an in-application purchases page) additional icons or features. Selecting the back button 1070 (or other actions such as backwards swipes) brings back the home page 700 or a previous page.

Figures 11A, 11B:
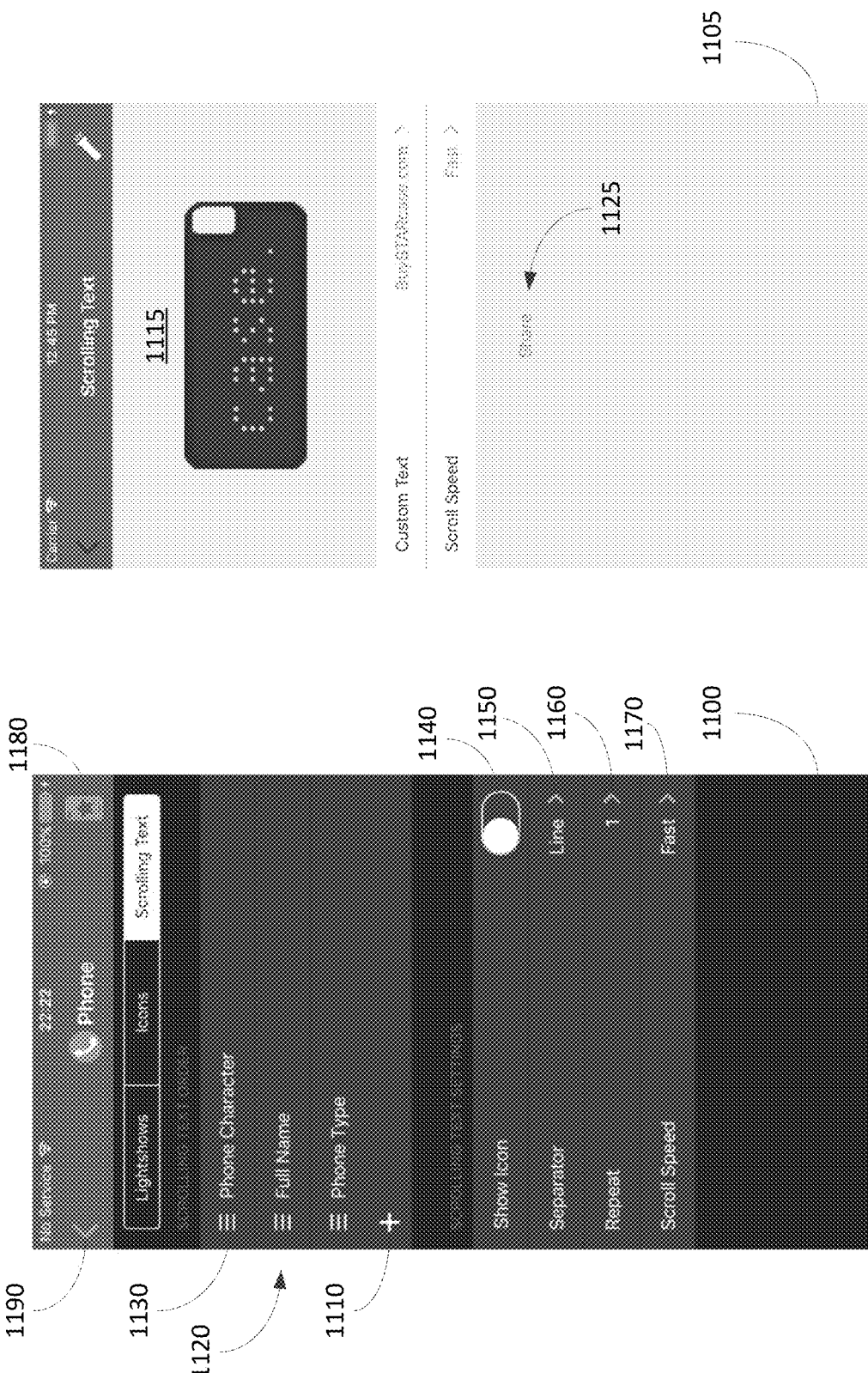
FIG. 11A shows an exemplary scrolling text page of a mobile application according to an embodiment of the present disclosure.
FIG. 11B shows another exemplary scrolling text page of a mobile application according to an embodiment of the present disclosure.

Selecting the scrolling text button 830 (e.g., graphical tab, graphical element, etc.) at the top of the phone page 800 shown in FIG. 8 or the scrolling text button 1080 at the top the icons page 1000 shown in FIG. 10 opens an exemplary scrolling text page 1100 according to an embodiment of the present disclosure as shown in FIG. 11A. The scrolling text page 1100 enables the user to select a text and/or a scrolling text and/or scrolling text parameters for assignment (e.g., assignment or re-assignment). Selecting text, scrolling text, and/or scrolling text parameters causes the mobile application to send the selected text, scrolling text, and/or scrolling text parameters to the mobile device cover 100. Referring to FIG. 11B, an exemplary scrolling text page 1105 is shown with a preview pane 1115 that enables the viewing of the scrolling text (e.g., customized scrolling text, preset scrolling text, etc.). The speed and text can be changed using the scrolling text page 1105. Further, as will be explained below with respect to FIGS. 25D-E, for example, the font and the orientation of the scrolling text can be changed and previewed. The preview changes as the user makes changes to the scrolling text. The preview pane 1115 can also be a pop-up window or a separate page. The previewed pane 1115 can also illustrate various changes in the scrolling text on a representation of a selected model of the mobile device cover 100. Further, the previewed display can also be actually displayed on the mobile device cover 100 to view the display (e.g., scrolling text display) in view of any scrolling text changes, for example. In some embodiments, clicking on a share icon 1125 enables the user to share the scrolling text (and/or particular lightshow, icon, etc.,) with others (e.g., friends, selected individuals, contacts, etc.). The sharing can be facilitated via a wired and/or wireless communication or transfer, a text, an email, a social media post or communication, etc. as text, a file, a graphics interchange format (GIF) file, an image, a video, a picture, a file stored in camera roll, etc.

Figure 12:
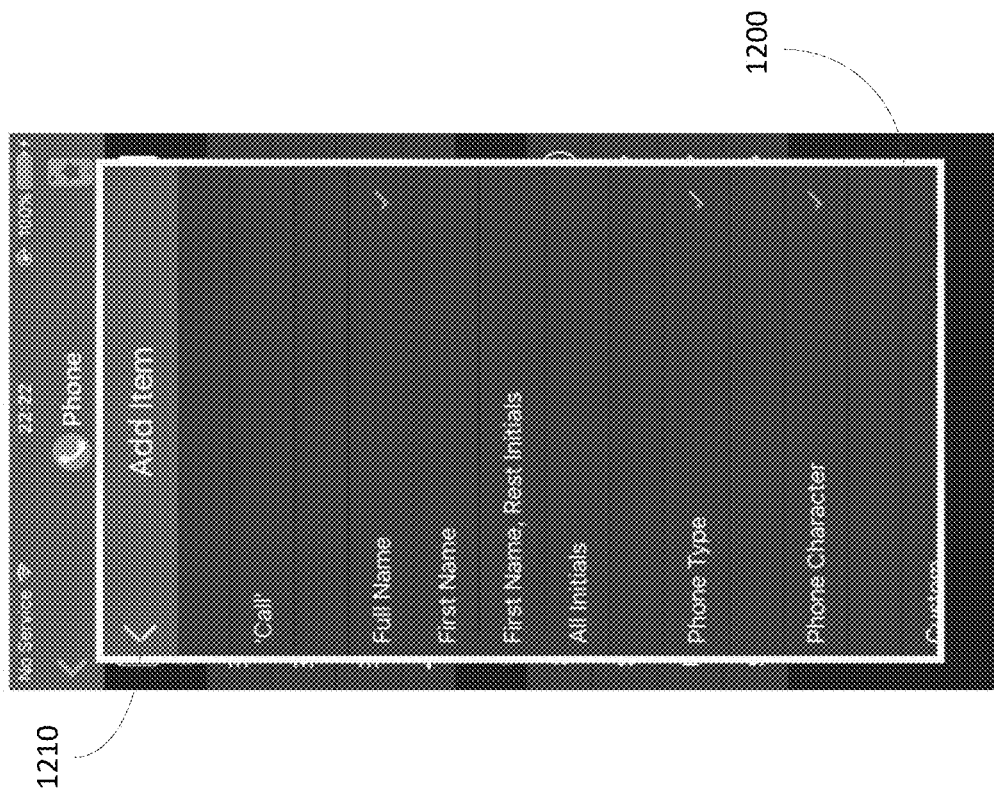
FIG. 12 shows an exemplary add item page of a mobile application according to an embodiment of the present disclosure.

By selecting an icon 1110 (e.g., a plus icon), an exemplary add item page 1200 according to an embodiment of the present disclosure is opened as shown in FIG. 12. The add item page enables a user to select text options for scrolling on the mobile device cover 100. Referring to FIG. 12, a user can add words, symbols, names, a phone type, and/or a phone character for scrolling. A user can cause the word "Call" to scroll across the mobile device cover 100 as part of a phone call notification or as part of a calendar alert, for example. In addition, different options for scrolling the name of the caller are available such as the full name, first name, first name and remaining name in initials, all initials, etc. Furthermore, the user can add a phone type, a phone character, or some other customized graphics for scrolling across the mobile device cover 100 as part of a notification, for example. Selecting the back button 1210 (or other actions such as backwards swipes) brings back the scrolling text page 1100.

Referring back to FIG. 11, further options for scrolling include changing the order and appearance of words, names, phone type, phone character, and/or icon for scrolling. The order of these options can be changed, for example, by moving the particular category of information being scrolled into a different position in the display order 1120 by selecting and moving the three lined icon 1130. The scrolling text page 1100 enables, via one or more graphical elements 1140, a user to display the icon before or after the scrolling text, or not at all. The scrolling text page 1100 further enables the user to select a type of separator, via a selection menu 1150, between different categories (e.g., name, phone character, phone type, etc.) for scrolling. For example, the separator can be one or more lines or spaces between different categories (e.g., phone character, name, phone type, icon, etc.). In addition, the scrolling text page 1100 provides for the user to determine, via selection menus 1160, 1170, the number of display repetitions (e.g., one, two, three, etc.) of the scrolling message and a scroll speed. In some embodiments, the scrolling text page 1100 provides an icon 1180 (e.g., a preview-on-case icon) that, when selected, causes the mobile device cover 100 to demonstrate the currently selected scrolling text and/or icon according to the selected scrolling text parameters and/or animations on the mobile device cover 100. In some embodiments, the mobile application can preview the scrolling text on the host mobile device 110, for example, as part of the lightshows page 810, the icons page 1000, the scrolling text page 1100, or a separate page, the selected scrolling text with or without accompanying icons or lightshows according to the scrolling text parameters and/or other parameters as it would appear on the mobile device cover 100. For example, the mobile application can provide a preview page that includes an image of the mobile device cover 100 (e.g., the selected model including color and other characteristics of that model of the mobile device cover 100) with the scrolling text as it would appear on the mobile device cover 100 during a notification or other display, for example. Selecting the back button 1190 (or other actions such as backwards swipes) brings back the home page 700 or a previous page.

Figures 13, 14:
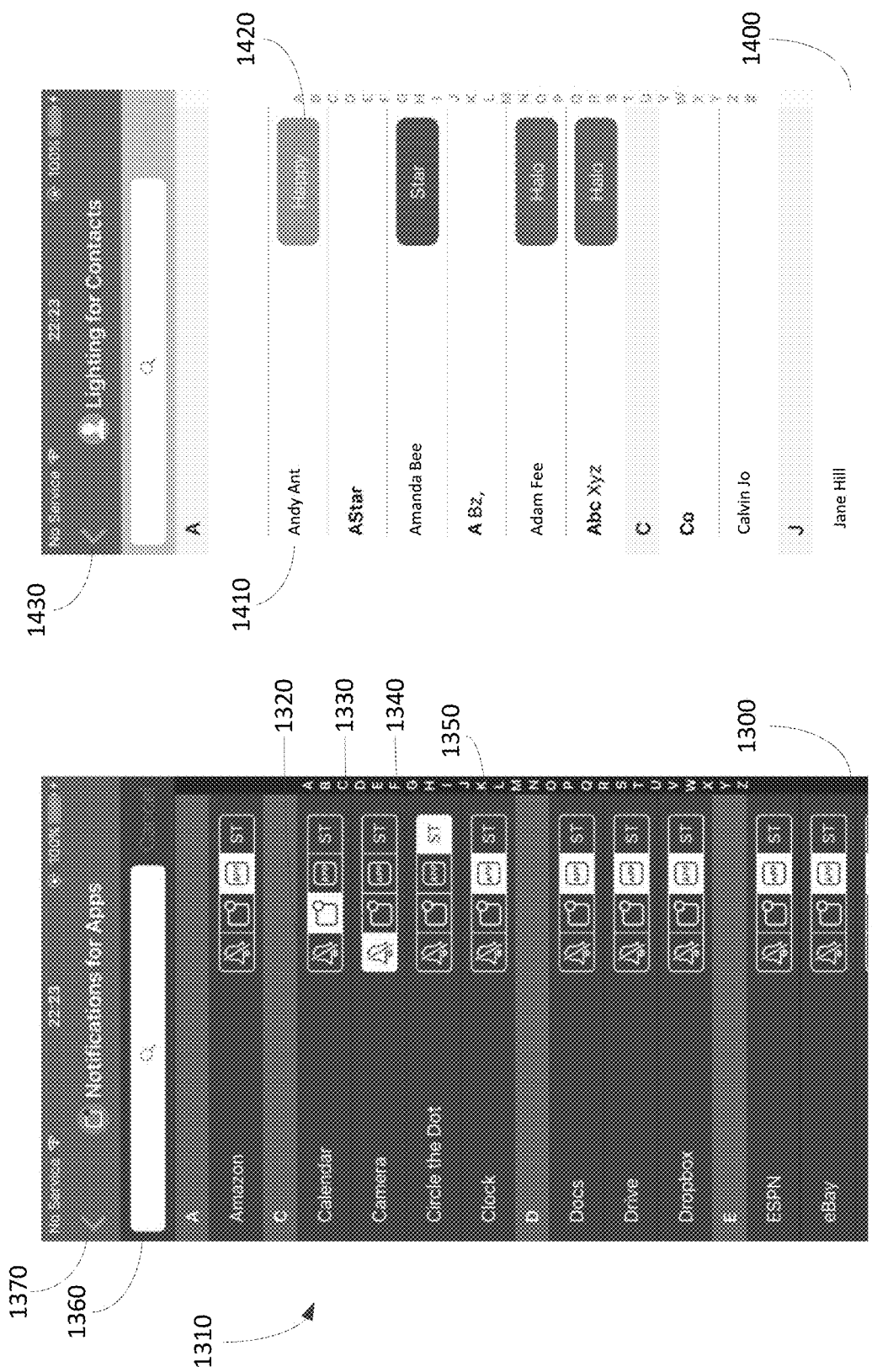
FIG. 13 shows an exemplary notifications-for-applications page of a mobile application according to an embodiment of the present disclosure.
FIG. 14 shows an exemplary lighting-for-contacts page of a mobile application according to an embodiment of the present disclosure.

In some embodiments, by selecting a notifications-for-applications button or link 740 (e.g., graphical element in a graphical user interface, the text "Notifications for App," etc.) on the home page 700 as shown in FIG. 7, an exemplary notifications-for-applications page 1300 is opened as shown in FIG. 13. The notifications-for-applications page 1300 enables users to view and change settings for applications for which the mobile application and the mobile device cover 100 support custom notifications. Referring to FIG. 13, a list of applications 1310 is shown for which the mobile application and the mobile device cover 100 support notifications. Some embodiments provide that the list of mobile applications include the mobile application installed on the host mobile device 110, any of the user's other host mobile devices or mobile devices, the mobile device cover 100, etc. For each listed application, the user can select (e.g., tap, toggle, etc.) various options. In some embodiments, a button or icon (e.g., a graphical element of a graphical user interface) is provided to turn on or off a particular notification parameter. Referring to FIG. 13, for each listed application, a graphical button 1320 is provided to turn on or off the displaying of notifications from the calendar application on the mobile device cover 100, for example. A graphical button 1330 is also provided for each listed application to turn on or off the displaying of the respective application name (e.g., Amazon, Calendar, etc.) on the mobile device cover 100 when the mobile application receives a notification for the respective application. A graphical button 1340 is provided for each listed application to turn on or off the displaying of a particular icon (e.g., application icon, customized icon, emoji, etc.) corresponding to the respective application when the mobile application receives a notification for the respective application. In addition, a graphic button 1350 is provided for each listed application to turn on or off the displaying of the contents of a notification (e.g., scrolling the contents of a notification on the mobile device cover 100, text or media from an email, a message, a textual alert, a sound, a transcription of a voicemail, etc.) when the mobile application receives the notification for the respective application. The notifications-for-applications page also provides a search bar 1360 for searching for applications by name, for example. Selecting the back button 1370 (or other actions such as backwards swipes) brings back the home page 700 or a previous page.

In some embodiments, by selecting a lighting-for-contacts button or link 750 (e.g., graphical element in a graphical user interface, the text "Lighting for Contacts," etc.) on the home page 700 as shown in FIG. 7, an exemplary lighting-for-contacts page 1400 is opened as shown in FIG. 14. The lighting-for-contacts page 1400 enables users to view and assign lightshows, icons, scrolling text, etc. for display on the mobile device cover 100, for example. Referring to FIG. 14, by selecting (e.g., tapping or some other user input) a contact name 1410 or a graphical button 1420 indicating an assigned lightshow, icon, etc., a lightshows-for-contacts page 1500 or an icon-for-contacts page 1600 is opened as shown in FIG. 15 or 16, respectively. In some embodiments, swiping left to right or right to left on the contact name 1410 or the graphical button 1420 indicating an assigned lightshow or icon, for example, causes the removal of the particular contact and/or the lightshow or icon assignment for a particular contact. The screen including the data displayed on the screen can be refreshed continuously, periodically, or aperiodically by a gesture (e.g., a swipe up or down, selecting a graphical element, etc.) on the screen. Selecting the back button 1430 (or other actions such as backwards swipes) brings back the home page 700 or a previous page.

FIG. 15 shows an exemplary lightshows-for-contacts page 1500 according to an embodiment of the present disclosure. In particular, by selecting the contact name, e.g., Hank Williams, or a graphical button indicating a lightshow assigned to Hank Williams on the lighting-for-contacts page 1400, the exemplary lightshows-for-Hank-Williams page 1510 opens as shown in FIG. 15. The lightshows-for-contacts page 1500 enables a user to change the lightshow and lightshow parameters assigned to a particular contact. The current lightshow for Hank Williams is listed as the Star lightshow 1520; however, other lightshows can be selected (e.g., by tapping or toggling on the lightshow name such as "Nova") from the lightshows list 1530 for assignment to Hank Williams. Parameters for the selected lightshow such as a speed (e.g., speed of an animation of the lightshow) and a duration of the lightshow care are controlled by sliding controls 1540, 1550 (e.g., graphical sliders). Data relating to the selected lightshow and lightshow parameters is sent to the mobile device cover 100. The selected lightshow is shown or previewed on a portion 1560 of the lighting-for-contacts page 1500 including any selected animations in accordance with any selected lightshow parameters. The preview also reflects the selected model including color or other characteristics (e.g., arrangement of LEDs or screens, resolution, etc.) of the selected model of the mobile device cover 100 so that the user can see how the lightshow looks on the selected model of the mobile device cover 100. The lightshows-for-contacts page 1500 also provides an icon 1570 (e.g., a preview-on-case icon) that, when selected, causes the mobile device cover 100 to demonstrate (e.g., actually display on the mobile device cover 100, cause LEDs of the mobile device cover 100 to light according to the lightshow, animations, and parameters, cause screens of the mobile device cover 100 to display according to the lightshow, animations, and parameters, etc.) the currently selected lightshow including any selected animations according to any selected lightshow parameters. Selecting (e.g., tapping or some other user input) on the assigned contacts button or link 1580 causes the assigned contacts page 900 to open. In some embodiments, the lightshows-for-contact page 1500 provides an icon that, when selected, enables a user to download or purchase (e.g., as part of an in-application purchases page) additional lightshows or features. Selecting the back button 1590 (or other actions such as backwards swipes) brings back the home page 700 or a previous page.

FIG. 16 shows an exemplary icons-for-contacts page 1600 according to an embodiment of the present disclosure. In particular, by selecting the contact name, e.g., Hank Williams, or a graphical button indicating an icon assigned to Hank Williams on the lighting-for-contacts page 1400, the icons-for-Hank-Williams page 1610 opens as shown in FIG. 16. Alternatively, if the lightshows-for-Hank-Williams page 1510 is already opened as shown in FIG. 15, then selecting the icons button 1595 (e.g., graphical tab) also opens the icons-for-Hank-Williams page 1610. The icons-for-contacts page 1600 enables a user to change the icon (e.g., an icon, an emoji, a graphical element, a custom-designed graphical element, a downloaded graphical element, a stored graphical element, etc.) and icon parameters assigned to a particular contact and/or for a particular type of notification for the particular contact. For example, in addition to speed and duration parameters, the icons-for-contacts page 1600 can also add animation to the icon. Other parameters that can be changed include, for example, parameters that change the color, size, intensity, pulsating, bursting, etc. of the icon. The information indicating the selected icon and icon parameters is sent to the mobile device cover 100. The selected icon is shown or previewed on a portion 1620 of the icons-for-contacts page 1600 (or on a separate page) including any selected animations in accordance with any selected icon parameters. The preview also reflects the selected model including color or other characteristics (e.g., arrangement of LEDs or screens, resolution, etc.) of the selected model of the mobile device cover 100 so that the user can see how the displayed icon looks on the selected model of the mobile device cover 100. The icons-for-contacts page 1600 also provides an icon 1630 (e.g., a preview-on-case icon) that, when selected, causes the mobile device cover 100 to demonstrate (e.g., actually display on the mobile device cover 100, cause LEDs of the mobile device cover 100 to light according to the icon, animations, and parameters, cause screens of the mobile device cover 100 to display according to the icon, animations, and parameters, etc.) the currently selected icon with any selected animations according to any selected icon parameters. Selecting (e.g., tapping or some other user input) on the assigned contacts button or link 1640 causes the assigned contacts page 900 to open. In some embodiments, the lightshows-for-contact page provides an icon that, when selected, enables a user to download or purchase (e.g., as part of an in-application purchases page) additional icons or features. Selecting the back button (or other actions such as backwards swipes) brings back the home page 700 or a previous page (e.g., the lightshows-for-contacts page).

FIG. 17 shows an exemplary battery page 1700 according to an embodiment of the present disclosure that is opened, for example, when the battery icon or link 760 on the home page 700 is selected. The battery page 1700 enables a user to view and change the battery settings of mobile device cover 100 and/or the host mobile device 110. For example, the battery page 1700 enables a user to turn on an autocharging feature of the mobile application. The user can set a start automatic charging parameter and a stop automatic charging parameter. The parameters can be, for example, battery charge percentages of the mobile device cover 100 battery or the host mobile device 110 battery. In an exemplary embodiment, a full battery charge is 100% and an exhausted battery charge is 0%, for example. In addition to battery charge percentages, the parameters can be in units of energy, charge, power, capacity, etc. Each parameter is set by selecting (e.g., tapping, toggling, or some other user input) the increase ("+") or decrease ("−") graphical buttons 1710 which incrementally increases or decreases the respective parameter accordingly. In some embodiments, when the mobile application senses that the battery charge percentage of the host mobile device 110 battery has dropped to or below the start automatic charging parameter, then the mobile application causes the mobile device cover 100 battery to charge the host mobile device 100 battery until the stop automatic charging parameter is reached. In some embodiments, similar automatic charging parameters are used by the mobile application to also cause the host mobile device 110 battery to charge the mobile device cover 100 battery. The parameters and information relating to whether the automatic charging feature enabled is sent by the mobile application to the mobile device cover 100 and/or the host mobile device 110. By selecting the manual tab 1770, the battery page 1700 also enables to user to initiate manual battery charging by selecting one battery (e.g., the mobile device cover 100 battery) to charge another battery (e.g., the host mobile device 110 battery) according to a selectable condition (e.g., battery charge, duration, etc.). The battery page 1700 also displays the battery charge or battery charge percentages 1720, 1730 of the batteries of the mobile device cover 100 and the host mobile device 110, respectively. When either battery is being charged, a charging icon 1740 is displayed over the battery FIG. 1750 or over the portion 1760 of the battery FIG. 1750 representing the battery that is being charged. Selecting the back button 1780 (or other actions such as backwards swipes) brings back the home page 700 or a previous page.

FIG. 18 shows an exemplary lighting page 1800 according to an embodiment of the present disclosure that is opened, for example, when the lighting icon or link 770 on the home page 700 is selected. The lighting page 1800 enables a user to set lighting settings for the mobile application and the mobile device cover 100. The lighting page lists a number of lighting options 1810 (e.g., flashlight, softlight, reading light, strobe light, panic light, etc.), the order of which can be changed by dragging the respective three lines icon 1820 corresponding to the lighting option to the appropriate place in the list. By selecting one of the lighting options (e.g., flashlight, softlight, panic light, etc.), the respective light parameters 1830 (e.g., brightness via slider 1840, duration via incremental adjustment buttons 1850, 1855, etc.) of the selected lighting option is viewed and can be modified. The mobile device cover 100 and/or the mobile application can operate according to one or more light options for a select time and/or duration, the one or more light options provided by the mobile device cover 100 including: a flashlight; a soft light; a panic light (e.g., a bright bursting light that may accompany a piercing sound); a selfie light (e.g., a soft ring of light to naturally illuminate a face during a selfie and used in conjunction, for example, with a camera of the host mobile device 110 or an external camera); a reading light (e.g., an adjustable light for reading); a strobe light; icons (e.g., static or animated icons including emojis displayed by one or more LEDs or on one or more screens); light shows; light patterns; scrolling text (e.g., favorite proverb or saying); and a clock. By selecting a respective icon (e.g., an "i" icon 1860), a corresponding page (e.g., clock page, lightshows page, icons page, etc.) opens. Referring to FIG. 18, when the flashlight option is selected, the mobile device cover 100 operates as a flashlight by one or both of turning on selected LEDs or turning on one or more screens to a particular brightness and/or hue, for example. The "on" and "off" tabs 1870, 1875 (e.g., icons, graphical elements, etc.) turn the flashlight on or off, respectively. The brightness and duration of the flashlight option can be set by a graphical slider 1840 or incremental adjustment icons (e.g., "+" icon 1850 and "−" icon 1855). The various options of the lighting page 1800 can be previewed in the mobile application (e.g., a portion of the lighting page 1800 or a separate page) and/or on the mobile device cover 100 (and host mobile device 110). As with all features described in the present disclosure, the mobile device cover 100 operates whether physically connected to host mobile device 110 or physically separated from the host mobile device 110. Selecting the back button 1880 (or other actions such as backwards swipes) brings back the home page 700 or a previous page.

In some embodiments, the lighting page 1800 provides the setup of a panic light, panic alert, hazards, blinkers, etc. For example, for use in an emergency situation, a user can enable the lighting page to set up a panic alert. The panic alert can be activated by a graphical button on the lighting page 1800 or on a home screen of the host mobile device 110, or a physical button on the host mobile device 110. The panic alert can also be activated by a graphical button on a screen or a physical button on the mobile device cover 100. The panic alert can include, for example, a panic light that is a light pattern at the highest intensities in a pattern (e.g., bursting light pattern, full LED on/off blue or other light pattern) configured to draw the most attention to the user and/or to disorient an attacker of the user, for example. Further, the panic alert can be accompanied with a loud sound or voice that is broadcast over the speakers of the mobile device cover 100 and/or the host mobile device 110. The sound or voice is configured to draw the most attention to the user and/or to disorient an attacker of the user, for example. The panic alert can also include, with or without a prompt, the dialing of an emergency phone number (e.g., police department, security system, emergency contact, etc.) and other configurations such as turning on the speaker phone. Other options of the panic alert can include, for example, the sending of text messages to various contacts notifying the various contacts of the emergency situation. The messages and/or phone call can include location information (e.g., via a satellite-based location determining system such as GPS and/or a ground-based location determining system) or other data to direct responders to the user location. The camera on the host mobile device 110 can be activated during a panic alert to take pictures at a selected intervals and/or to take one or more movies, which can be sent automatically and/or stored. These options can be set up for the panic light link on the lighting page 1800 that can open up a menu or a separate page for these panic alert settings and/or parameters.

Figures 19, 20:
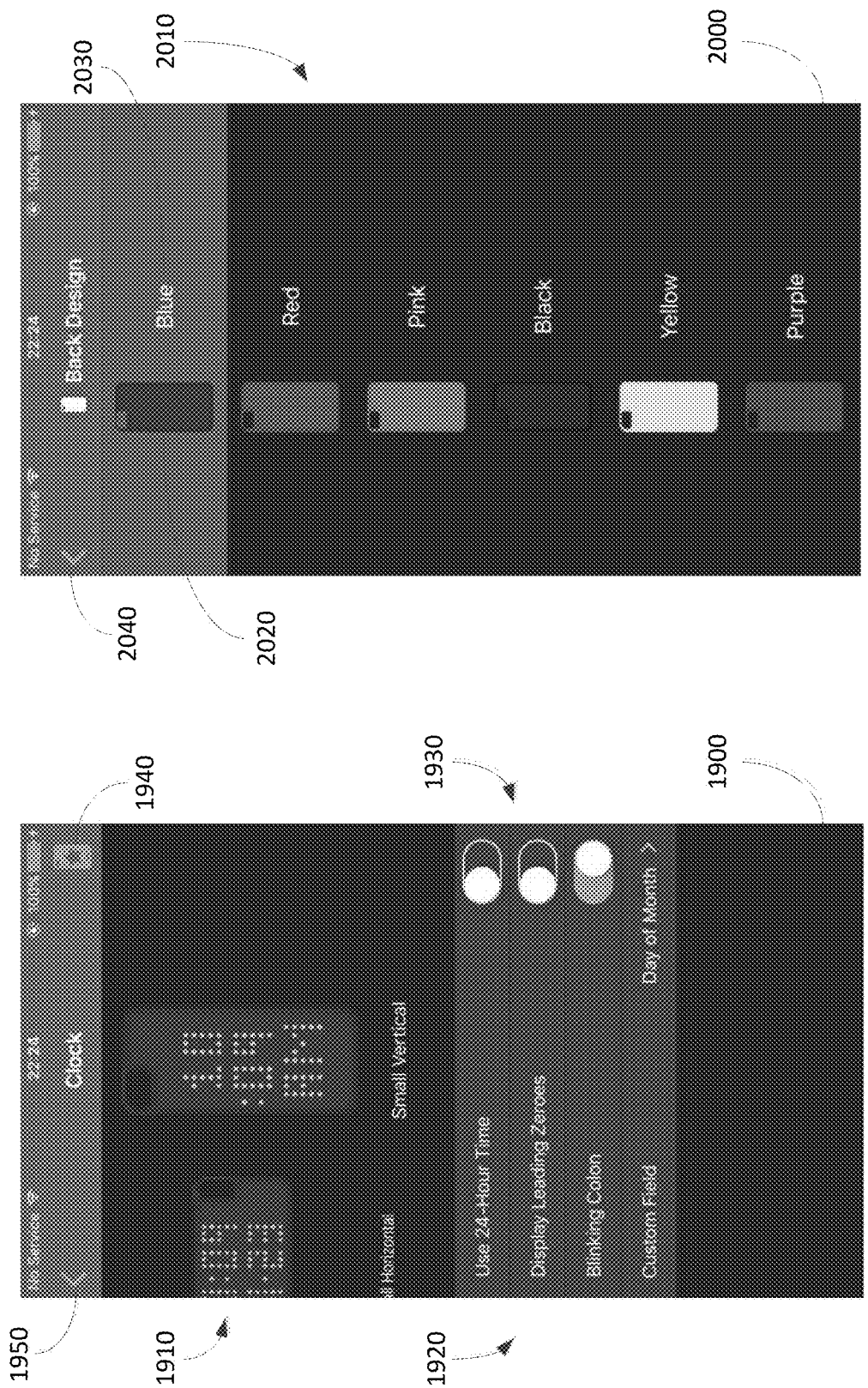
FIG. 19 shows an exemplary clock page of a mobile application according to an embodiment of the present disclosure.
FIG. 20 shows an exemplary back design page of a mobile application according to an embodiment of the present disclosure.

FIG. 19 shows an exemplary clock page 1900 according to an embodiment of the present disclosure that is opened, for example, when the clock icon or link 1885 (e.g., the "Clock" link) on the lighting page 1800 is selected. The clock page 1900 enables a user to set clock settings for display by the mobile device cover 100. Referring to FIG. 19, different clock faces 1910 can be selected, for example, by swiping the clock face menu options (e.g., vertical view, horizontal view, portrait view, landscape view, stop watch view, etc.). Different parameters 1920 can be set by corresponding icons (e.g., graphical toggle switches 1930). For example, the following parameters can be set to affect the clock display on the mobile device cover 100: 12-hour time format, 24-hour time format, displaying leading zeroes, blinking colon, etc. Further, custom fields can be selected and/or set. For example, custom fields can be used to further display and/or set calendar information, time zone information, additional time zone information times, highlighted world time zone map, etc. In some embodiments, the clock page provides an icon 1940 (e.g., a preview-on-case icon) that, when selected, causes the mobile device cover 100 to demonstrate the currently selected clock according to the selected clock face and other clock parameters on the mobile device cover 100. Selecting the back button 1950 (or other actions such as backwards swipes) brings back the home page 700 or a previous page (e.g., the lighting page 1800).

FIG. 20 shows an exemplary back design page 2000 according to an embodiment of the present disclosure that is opened, for example, when the back design icon or link 780 (e.g., icon and/or "Lighting" link) on the home page 700 is selected. The back design page 2000 enables a user to select a particular back design and/or mobile device cover 100 model. Referring to FIG. 20, a listing 2010 of back designs can be viewed by swiping up or down, for example, on a touch-sensitive screen of the host mobile device 110. Selection of a particular back design occurs by selecting (e.g., tapping, toggling, or some other user input) the particular back design graphic 2020 or the back design description 2030 (e.g., the "Blue" link). The selection of the particular back design and/or mobile device cover 100 model affects the available lightshows, icons, animations, etc. that are adjustable for the selected back design and/or mobile device cover 100 model. For example, each mobile device cover 100 model and/or particular back design can have its own arrangement of lights (e.g., LEDs, indicators, etc.), screens, and/or features. Accordingly, the available lightshows, icons, animations, etc. available for display on the light arrangements and/or screens of the selected mobile device cover 100 model and/or back design vary according to the selected mobile device cover 100 model and/or back design. Further, the mobile application uses the selected mobile device cover 100 model and/back design when displaying selected lightshows, icons, animations, etc. during a preview, for example. For example, when the mobile application is running on the host mobile device 110, the host mobile device 110 can preview the selected lightshow, icons, animations, etc. using a page (e.g., lightshows page, lightshows-for-contacts page, icons page, a preview page, etc.) of the mobile application. The graphical preview provided by a page of the mobile application incorporates the selected mobile device cover 100 model and/or back design (e.g., structural features, colors, etc.). Selecting the back button 2040 (or other actions such as backwards swipes) brings back the home page 700 or a previous page.

Figures 21, 22:
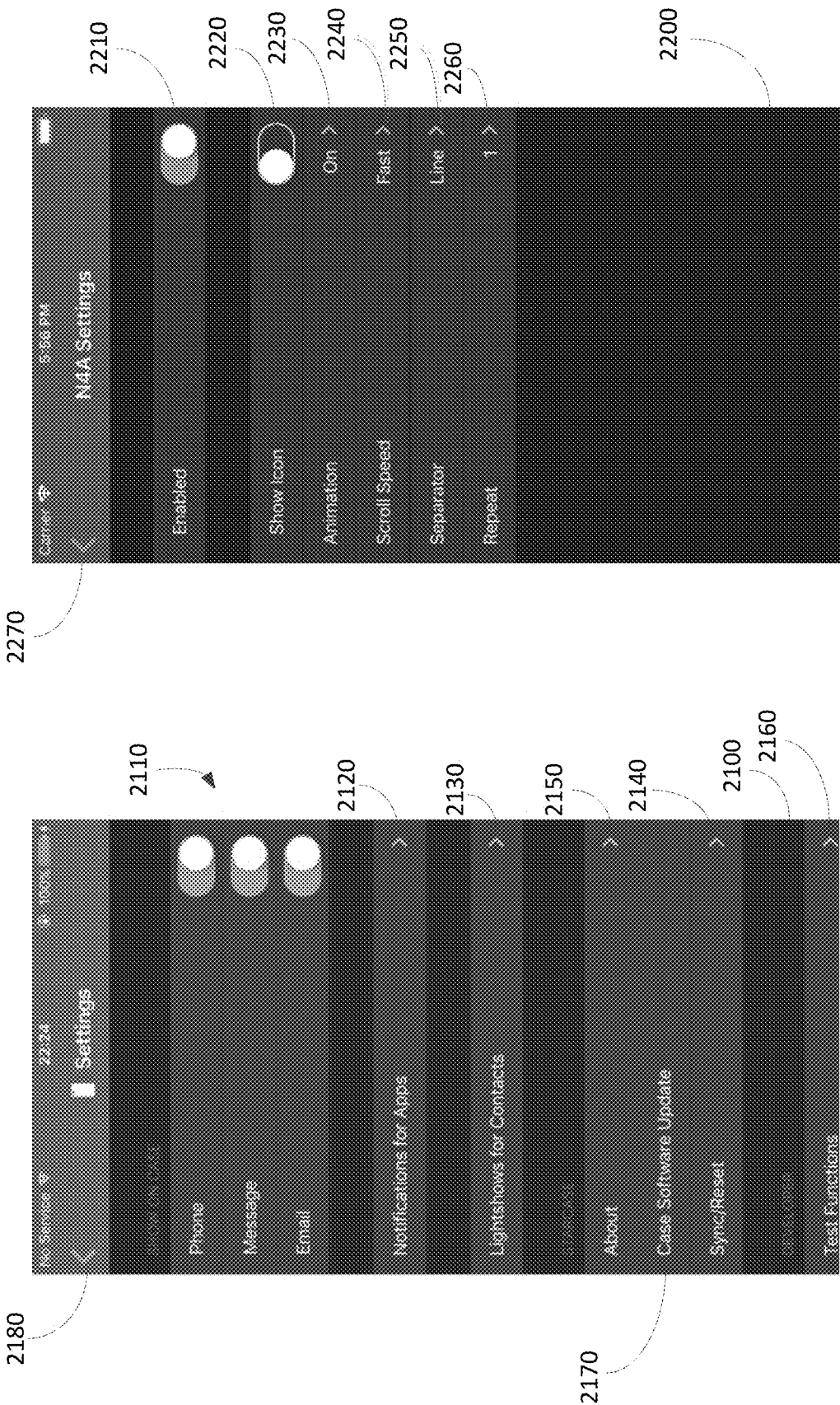
FIG. 21 shows an exemplary settings page of a mobile application according to an embodiment of the present disclosure.
FIG. 22 shows an exemplary notifications-for-applications settings page of a mobile application according to an embodiment of the present disclosure.
Figures 25D, 25E:
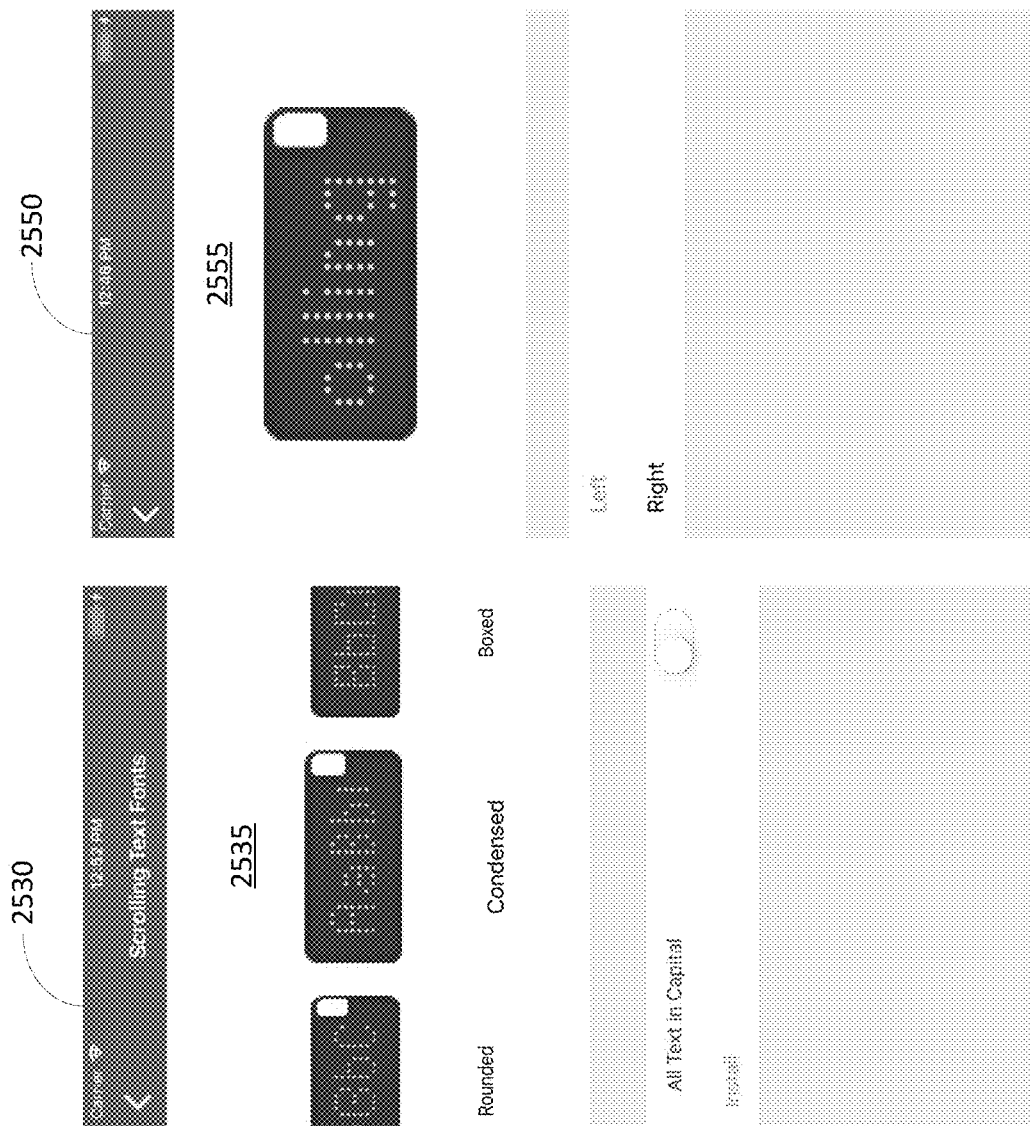
FIG. 25D shows an exemplary preview on a mobile device cover according to an embodiment of the present disclosure.
FIG. 25E shows an exemplary preview on a mobile device cover according to an embodiment of the present disclosure.

FIG. 21 shows an exemplary settings page 2100 that is opened, for example, when the settings icon or link 790 (e.g., settings icon or "Settings" link") on the home page 700 is selected. The settings page 2100 enables a user to view and change general settings and other settings. For example, the settings page 2100 can be used to change fonts, languages, display orientation, etc. via its graphical user interface. Referring to FIG. 25D, an exemplary scrolling text fonts page 2530 is shown with a preview pane 2535 that enables the viewing and/or selection of different fonts such as, for example, rounded, condensed, boxed, and other font choices that are not shown. By a swipe or other gesture on a screen, for example, other font choices can be viewed. Further, the option of all text being in capitals is provided. The preview pane 2535 can also be a pop-up window or a separate page. The previewed pane 2535 can also illustrate various changes in fonts on a representation of a selected model of the mobile device cover 100. Further, the previewed display can also be actually displayed on the mobile device cover 100 to view the display (e.g., scrolling text display) in view of any font changes, for example. Referring to FIG. 25E, an exemplary scrolling orientation page 2550 is shown with a preview pane 2555 that enables the viewing and/or selection of different orientations (e.g., whether the text scrolls up, down, left, right, whether the text is in landscape or portrait format, etc.) for the scrolling text. The preview pane 2555 can also be a pop-up window or a separate page. The previewed pane 2555 can also illustrate various changes in orientation on a representation of a selected model of the mobile device cover 100. Further, the previewed display can also be actually displayed on the mobile device cover 100 to view the display (e.g., scrolling text display) in view of any orientation changes, for example. Some embodiments provide that the host mobile device 110 and/or the mobile device cover 100 can determine, for example, whether the host mobile device 110 and/or the mobile device cover 100 is upside down or some other orientation, for example, via an internal gyroscope and/or accelerometer, for example, and automatically re-orient the displayed information accordingly so that the displayed information is easily read by a user.

Referring back to FIG. 21, respective icons 2110 (e.g., graphical switches or graphical elements that can be selected or toggled) are selected to turn on or off corresponding categories of notifications. For example, phone notifications, message notifications, email notifications, alerts, application notifications, or other notifications supported and displayed on the mobile device cover 100 and/or the host mobile device 110 can be turned on or off. Further, by selecting an icon or link 2120, 2130, 2140 on the settings page 2100, a notifications-for-applications page 2200, a lightshows-for-contacts page 2300, a synchronization/reset page 2400, etc. can be opened. The settings page 2100 also provides icons or links 2150, 2160 that open an about page, a test functions page, and other settings pages. The about page enables the user to view model or version details of the mobile application and/or the mobile device cover 100. In addition, an icon or link 2170 is provided to facilitate the update of the mobile application on the host mobile device 110 and/or the mobile device cover 100, and the software and/or circuitry on the mobile device cover 100. Selecting the back button 2180 (or other actions such as backwards swipes) brings back the home page 700 or a previous page.

FIG. 22 shows an exemplary notifications-for-applications settings page 2200 according to an embodiment of the present disclosure that is opened, for example, when the notifications-for-applications icon or link 2120 on the settings page 2100 is selected. The notifications-for-applications settings page 2200 enables a user to view and make changes (e.g., generally or specifically) to parameters governing the display of application notifications on the mobile device cover 100. Referring to FIG. 22, various parameters can be set by the user. For example, the user can generally (or specifically) enable or disable, via a graphical switch 2210, the application notifications being shown on the mobile device cover 100 for phone notifications, message notifications, email notifications, application notifications, etc. When enabled, the user can then set other general or specific parameters for the application notifications. The notifications-for-applications settings page 2200 provides the user with an icon 2220 (e.g., graphical switch or graphical element that can be tapped or toggled) that causes icons (e.g., icons, emojis, graphical designs, animations, lightshows, light icons, scrolling text, etc.) to be included or not included during an application notification displayed on the mobile device cover 100. Other parameters for general or specific application notifications that a user can view and modify include turning on/off animations 2230 and/or text scrolling, and setting a scroll speed 2240, a type of separator 2250 between text and/or icons, a number of repeat times 2260, etc. Selecting the back button 2270 (or other actions such as backwards swipes) brings back the home page 700 or a previous page (e.g., the settings page 2100).

Figures 23, 24:
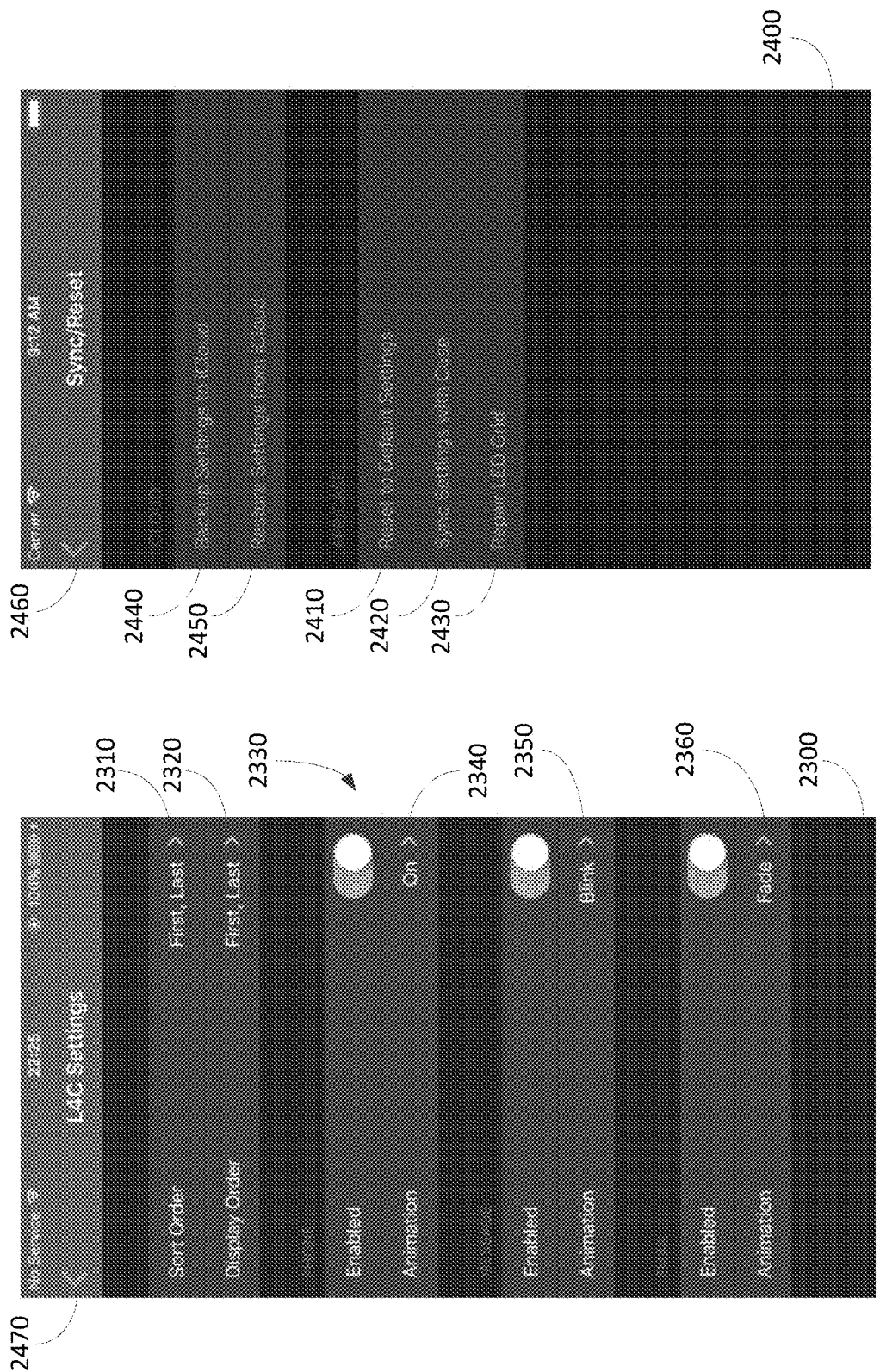
FIG. 23 shows an exemplary lightshows-for-contacts settings page of a mobile application according to an embodiment of the present disclosure.
FIG. 24 shows an exemplary synchronization/reset page of a mobile application according to an embodiment of the present disclosure.

FIG. 23 shows an exemplary lightshows-for-contacts settings page 2300 according to an embodiment of the present disclosure that is opened, for example, when the lightshows-for-contacts icon or link 2130 on the settings page 2100 is selected. The lightshows-for-contacts settings page 2300 enables a user to view and make changes (e.g., generally or specifically) to parameters governing the display of contact lightshows on the mobile device cover 100. Referring to FIG. 23, various parameters can be set by the user. For example, the lightshows-for-contacts settings page 2300 provides a sort order icon or link 2310 (e.g., that provides a pop up menu) that is selected to set a sorting parameter for contacts (e.g., a list of contacts) in the mobile application, and a display order icon or link 2320 that is selected to set a display parameter for contacts (e.g., first name before last name when a contact is displayed on the mobile device cover 100). Further, the lightshows, icons (e.g., light icons), scrolling text, etc. for the phone, message, email, etc. are enabled or disabled by icons 2330 (e.g., graphical switches or graphical elements that can be selected or toggled). In addition, content can be displayed on the mobile device cover 100 including, for example, phone numbers, email addresses, transcriptions of voice mails, the body of emails, the body of texts, attachments to the emails or texts, etc. Different parameters can be generally be set for the different types of communication, for example, to distinguish them from each other. For example, once a particular category of application notification has been enabled, animations can be turned on or off (e.g., via graphical switch 2340), particular animations can be chosen, and other animation characteristics (e.g., blink, fade, etc.) of the animations can be set (e.g., via menus links 2450, 2460) for the general categories such as notifications for phone, messages, emails, etc. or for specific phone numbers, messages/emails from specific senders, etc. In some embodiments, animations and animation parameters can be set for groups (e.g., subsets) of contacts depending upon the type of communication. Selecting the back button 2470 (or other actions such as backwards swipes) brings back the home page 700 or a previous page (e.g., the settings page 2100).

FIG. 24 shows an exemplary synchronization/reset page 2400 that is opened, for example, when the synchronization/reset icon or link 2140 on the settings page 2100 is selected. By selecting the reset-to-default icon or link 2410, the synchronization/reset page 2400 enables the user to reset the mobile application settings to original default values and clear contact lists and other information in the mobile application. The default values and other information are sent to and/or stored in the mobile device cover 100 and/or the host mobile device 110. By selecting the sync-settings-with-case icon or link 2420, the synchronization/reset page 2400 enables the user to synchronize the mobile application with the mobile device cover 100, for example, by sending present values/settings and other present information (e.g., present settings, contact lists, selected animations, icons, parameters, etc.) to the mobile device cover 100 or vice versa. Further, by selecting the repair-LED-grid icon or link 2430, the synchronization/reset page enables a rewrite of all sectors for the mobile device cover 100, including sectors that store light patterns, light shows, fonts, icons, animations, clock faces, graphical elements, graphical designs, pictures, video, etc. The synchronization/reset page 2400 also provides an icon or link 2440 for backing up settings and/or other information to a cloud network. The mobile application also provides an icon 2450 for restoring settings and/or other information of the mobile application and/or mobile device cover 100 from settings and/or other information stored on the cloud network. In some embodiments, selections made on the synchronization/reset page 2400 include warnings about the information being lost if the user proceeds with the synchronization, reset, repair, and/or restore. For example, resetting or synchronizing the mobile application and/or the mobile device cover 100 can cause the settings and lookup tables (or other types of memory or storage) in the mobile device cover 100 to be overwritten. Selecting the back button 2460 (or other actions such as backwards swipes) brings back the home page 700 or a previous page (e.g., the settings page 2100).

Some embodiments of the mobile device cover 100 according to the present disclosure provide one or more buttons (e.g., physical push buttons, graphical buttons, etc.) for controlling the mobile device cover 100 in addition to or instead of the mobile application as described herein. Some embodiments provide that the button can be or include any type of sensor (e.g., heat sensor, capacitive sensor, touch sensor, pressure sensor, proximity sensor, electromagnetic sensor, etc.). For example, an exemplary mobile device cover 100 might have a single physical button 2610 that is used to control various features of the mobile device cover 100, for example, without unlocking the host mobile device 110 and/or opening the mobile application. By holding down the button for a particular amount of time, a particular menu is displayed on a screen 162 or an array of lights (e.g., lights 160) of the mobile device cover 100. Referring to FIG. 26, if the button 2610 is held down between 0.10 and 0.49 seconds, then a battery menu is shown on the mobile device cover 100. If the button 2610 is continued to be held down between 0.50 and 1.99 seconds, then the battery menu is replaced with a notifications menu.

In some embodiments, the mobile device cover 100 displays a simplified menu with simplified options, compared to the mobile application, that can be selected using the button 2610 on the mobile device cover 100. The simplified options might be appropriate, for example, where the array of lights 160 that form a display on the mobile device cover 100 provide a low resolution display, or where fewer choices make for easier access via the button 2610 on the mobile device cover 100. Nevertheless, some embodiments provide access to the menu of some or all options by using the single button 2610 regardless of the resolution of the display of the mobile device cover 100. Using the screen 162 of the mobile device cover 100, a similar look-and-feel as the mobile application running on the host mobile device 110 can be provided.

Exemplary button hold times with corresponding exemplary menus are shown below according to an embodiment of the present disclosure:

| | |
|---|---|
| 0.10-0.49 seconds | Battery Menu |
| 0.50-1.99 seconds | Notifications Menu |
| 2.00-3.99 seconds | Lighting Menu |
| 4.00-5.99 seconds | Silence Menu |
| 6.00-7.99 seconds | Bluetooth or Wireless Menu |
| 8.00-9.99 seconds | Power Menu. |

Other menus/options and/or time intervals are also contemplated and within the scope of the present disclosure. Further, the mobile device cover 100 and the host mobile device 110 need not be in physical contact since the mobile device cover 100 and the host mobile device 110 can communicate wirelessly, and/or since many of the icons, lightshows, values, parameters, contacts, processor-executable instructions, etc. are accessible from storage and/or memory on the mobile device cover 100.

According to an embodiment of the present disclosure, when the single button 2610 is being held, the mobile device cover 100 displays the battery menu from 0.10-0.49 seconds, and then replaces the battery menu with the notifications menu as the single button is being held from 0.50-1.99 seconds (as shown in FIG. 26), and then replaces the notifications menu with a lighting menu as the single button is being held from 2.00-3.99 seconds, etc. If the button is held longer than 9.99 seconds in this exemplary example, then the menus restart from the beginning with the battery menu. In some embodiments, if the button is held longer than 9.99 seconds, then the menu closes out. If the button 2610 is released between 0.50 and 1.99 seconds, for example, then the notifications menu remains on display. In some embodiments, the various options within a particular menu similar to the mobile application can be accessed by quickly pushing (e.g., clicking, toggling, tapping, etc.) the button 2610 to jump or scroll through options, or holding down the button for a period of time to select a particular option or until the particular option is highlighted, for example.

Some embodiments provide that the button 2610 of the mobile device cover 100 enables a user to choose among simplified options compared to the mobile application or to choose among options that have been set up by the mobile application.

Figure 27:
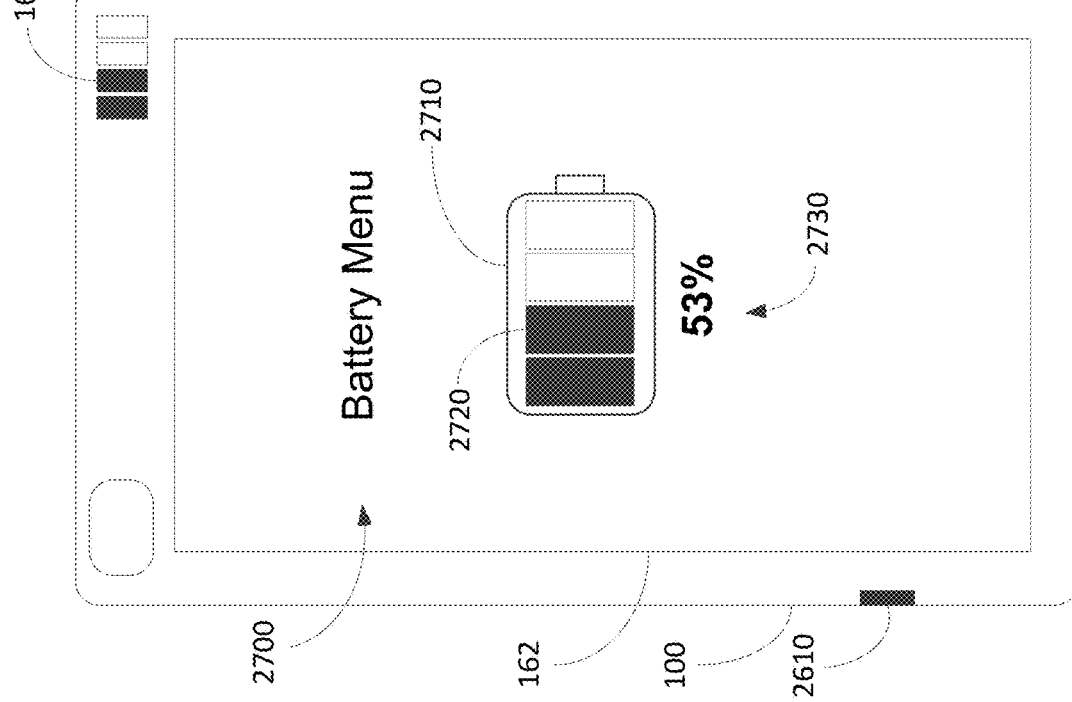
FIG. 27 shows an exemplary battery menu displayed on a mobile device cover according to an embodiment of the present disclosure.

For example, if the button 2610 is initially held down between 0.10-0.49 seconds, then an exemplary battery menu 2700 as shown in FIG. 27 displays, on the mobile device cover 100, the current state of the battery of the mobile device cover 100 and/or the host mobile device 110. Clicking on or releasing the button 2610 can cause the current state of the battery of the mobile device cover 100 and/or the battery of the host mobile device 110 to be displayed on the mobile device cover 100. The battery status can be displayed on the lights 160 (or beads 180) and/or one or more screens 162 of the mobile device cover 100. Referring to FIG. 27, the mobile device cover 100 displays a battery icon 2710 with two of four graphical bars 2720 filled in on the screen 162 with a battery charge percentage 2730 shown as 53%, for example. In addition to or instead of the battery icon 2710 being displayed on the screen 162 (or an array of lights 160), a set of four lights 160 is shown with two lights turned on and two lights off as an indication of battery charge percentage. The battery menu 2700 can also provide charging options such as enabling or initiating a manual charge of the host mobile device 110 by the mobile device cover 100 by clicking the button 2710 on the mobile device cover 100 for manual charging option on the battery menu 2700. The battery menu 2700 can time out after a particular duration (e.g., 5 seconds) of inactivity or after a button press and hold for a preset duration.

Figure 28:
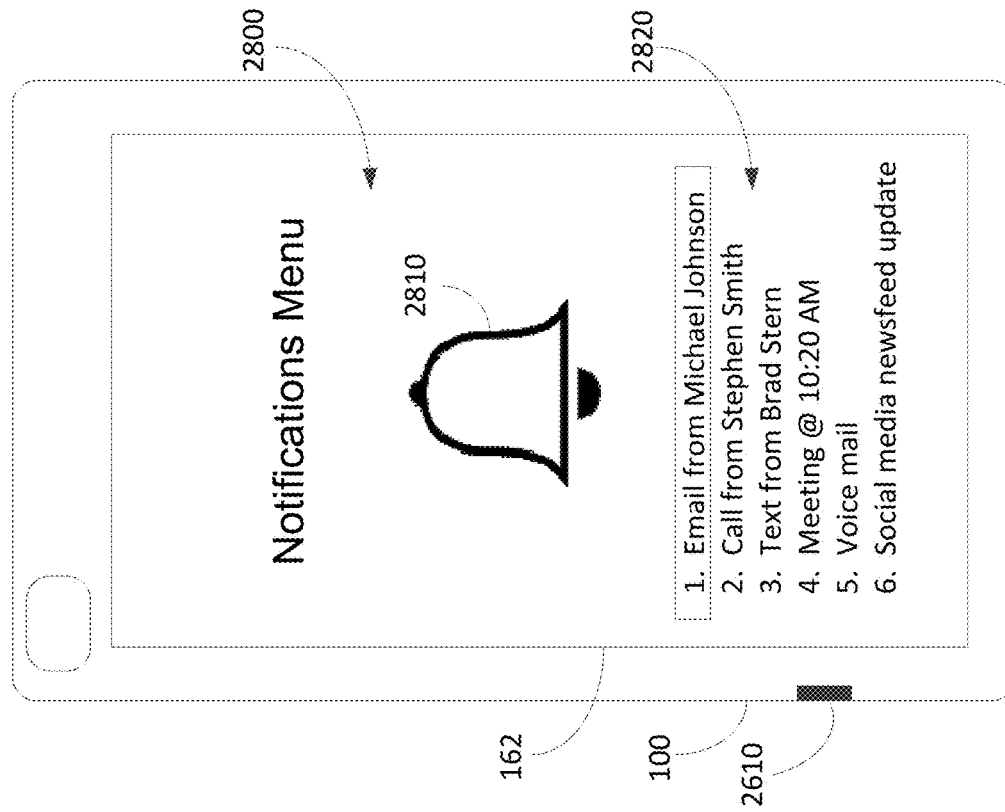
FIG. 28 shows an exemplary notifications menu displayed on a mobile device cover according to an embodiment of the present disclosure.

If the button 2610 is initially held down long enough (e.g., between 0.50 and 1.99 seconds), an exemplary notifications menu 2800 as shown in FIG. 28 is displayed on the mobile device cover 100. In some embodiments, when the button 2610 is released or clicked, a notification icon 2810 is displayed on the mobile device cover 100 along with the most recent notifications 2820. By clicking the button 2610, the user can quickly scroll through the various notifications on the lights and/or screens of the mobile device cover 100. Scrolling through the notifications can cause the status of the notifications to change from "unread" to "read." The notifications can include, for example, calendar alerts, emails, voice mails alerts, voice mail transcriptions, missed call alerts, text messages, missed video communication, news, stock quotes, sport scores, weather, etc. The notifications can include scrolling text, animated icons or emojis, lightshows, pictures, videos, video voicemails, source information (e.g., contact information, names, email addresses, phone numbers, etc.), etc. Opening a particular notification by holding the button 2610 over the particular notification enables the user to access the content of the notification including, for example, an audio voice message, a voice mail transcription, the body of a message or email, etc., as well as further details about the notifications including, for example, source information (email address, phone number, name, etc.), time of notification, calendar event details, etc. The notification menu 2800 can time out after a particular duration of inactivity or after a button press and hold for a preset duration.

Figure 29:
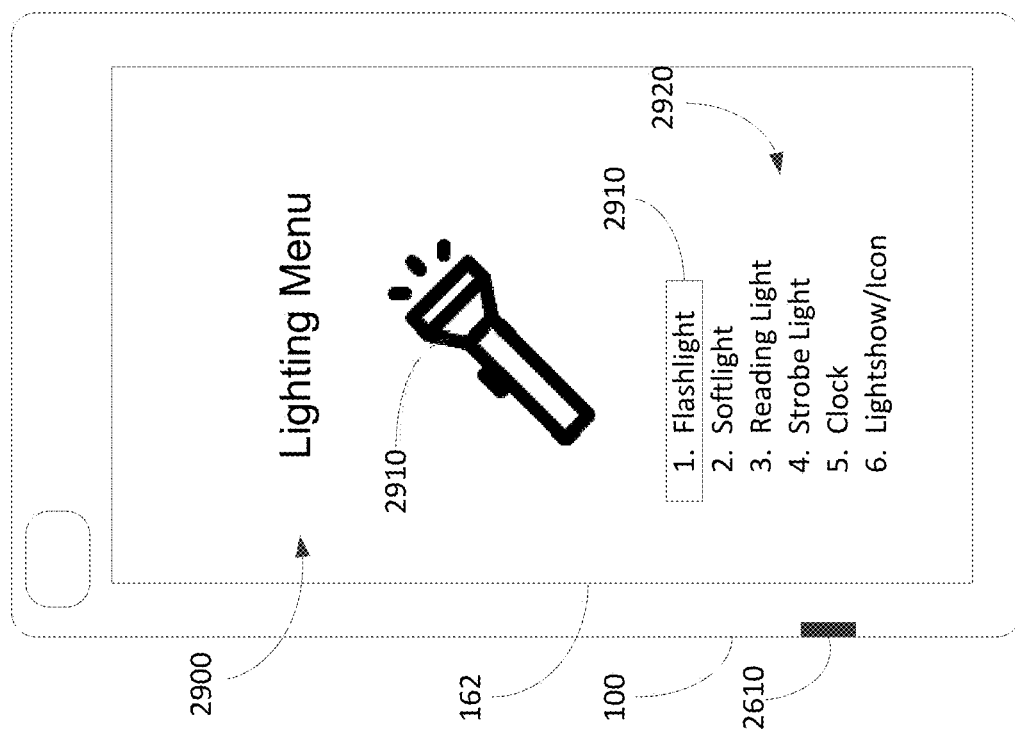
FIG. 29 shows an exemplary lighting menu displayed on a mobile device cover according to an embodiment of the present disclosure.
Figure 32:
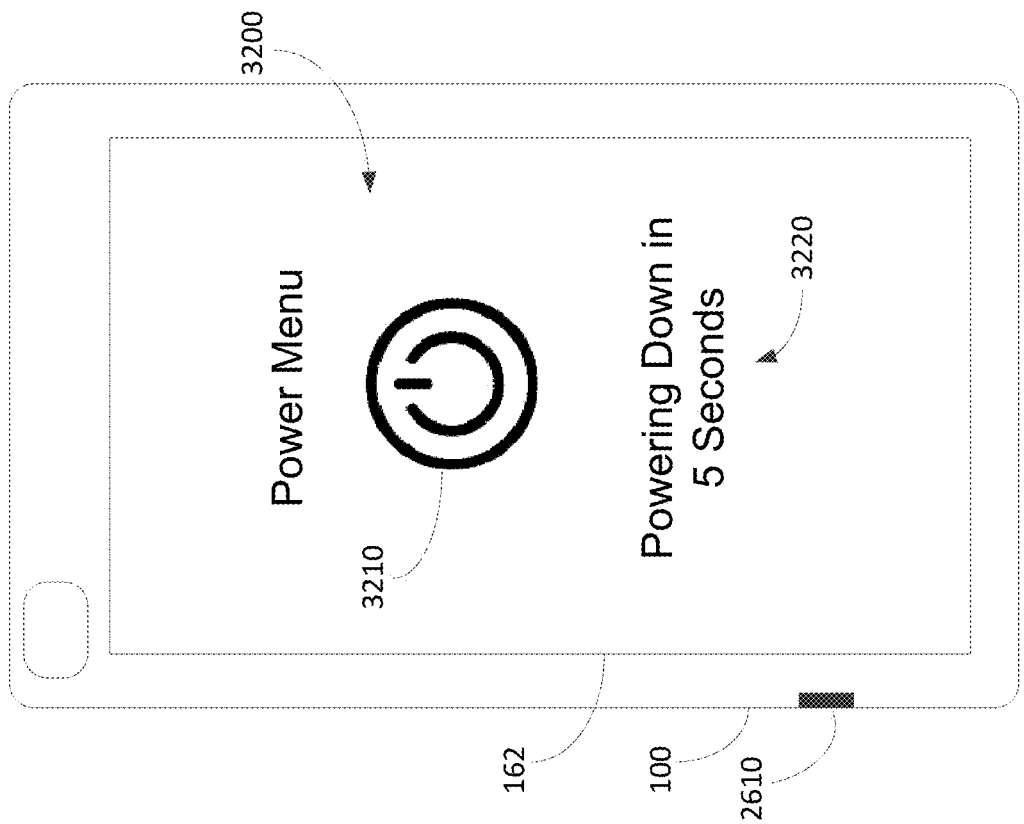
FIG. 32 shows an exemplary power menu displayed on a mobile device cover according to an embodiment of the present disclosure.

If the button 2610 is initially held down long enough (e.g., between 2.00 and 3.99 seconds), an exemplary lighting menu 2900 is displayed on the mobile device cover 100 as shown in FIG. 29. In some embodiments, when the button 2610 is released or clicked, a flashlight icon 2910 is displayed on the mobile device cover 100 along with the first option 2920 and/or a list 2930 of lighting options (e.g., flashlight, softlight, reading light, strobe light, panic light, etc.). The order of the lighting options was previously set on the lighting page 1800 as described above, or can be set by using the button 2610. If the flashlight option is the first lighting option, for example, then the mobile device cover 100 either initially operates as a flashlight or operates as a flashlight after a long click of the button 2610. If the reading light is the first lighting option, for example, then the mobile device cover 100 operates as a reading light. By quickly clicking the button 2610, the next lighting option on the list of light options 1810 as previously set forth in the lighting page 1800 is highlighted and/or activated. The lighting menu can time out after a button 2610 press and hold for a preset duration or based on an event or condition such as the battery of the mobile device cover 100 is below a threshold battery charge percentage.

Figure 30:
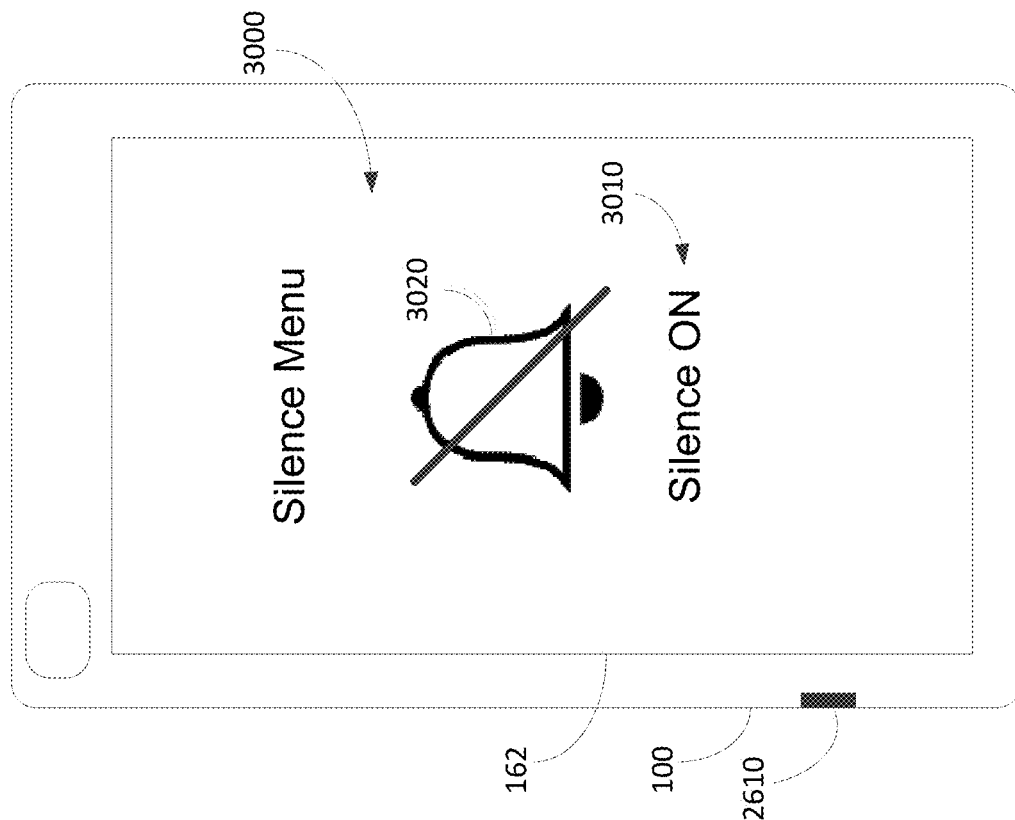
FIG. 30 shows an exemplary silence menu displayed on a mobile device cover according to an embodiment of the present disclosure.

If the button 2610 is initially held down long enough (e.g., between 4.00 and 5.99 seconds), an exemplary silence menu 3000 is displayed on the mobile device cover 100 along with the current state 3010 of notification silence and corresponding state icon 3020 as shown in FIG. 30. By releasing or clicking the button 2610, the state 3010 of notification silence and corresponding state icon 3020 changed. For example, a state 3010 of notification silence (e.g., an off state, a disabled state, etc.) might initially cause the mobile device cover 100 not to display any notifications (e.g., an off state, a disabled state, etc.). By clicking on the button 2610, the state 3010 of notification silence is changed (e.g., an on state, an enabled state, etc.) so that the mobile device cover 100 displays any notifications received by the mobile device cover 100 and/or from the host mobile device 110, for example. In some embodiments, different levels of granularity are applied with respect to changing the states of notification silence. For example, a long click of the button 2610 causes the silence menu 3000 to provide silence settings broken down per category (e.g., phone, email, text messages, etc.). By clicking through the list of categories, the user can turn on or off the notification settings for a particular category of notification. The silence menu 3000 can time out after a particular duration of inactivity or after a button 2610 press and hold for a preset duration.

Figure 31:
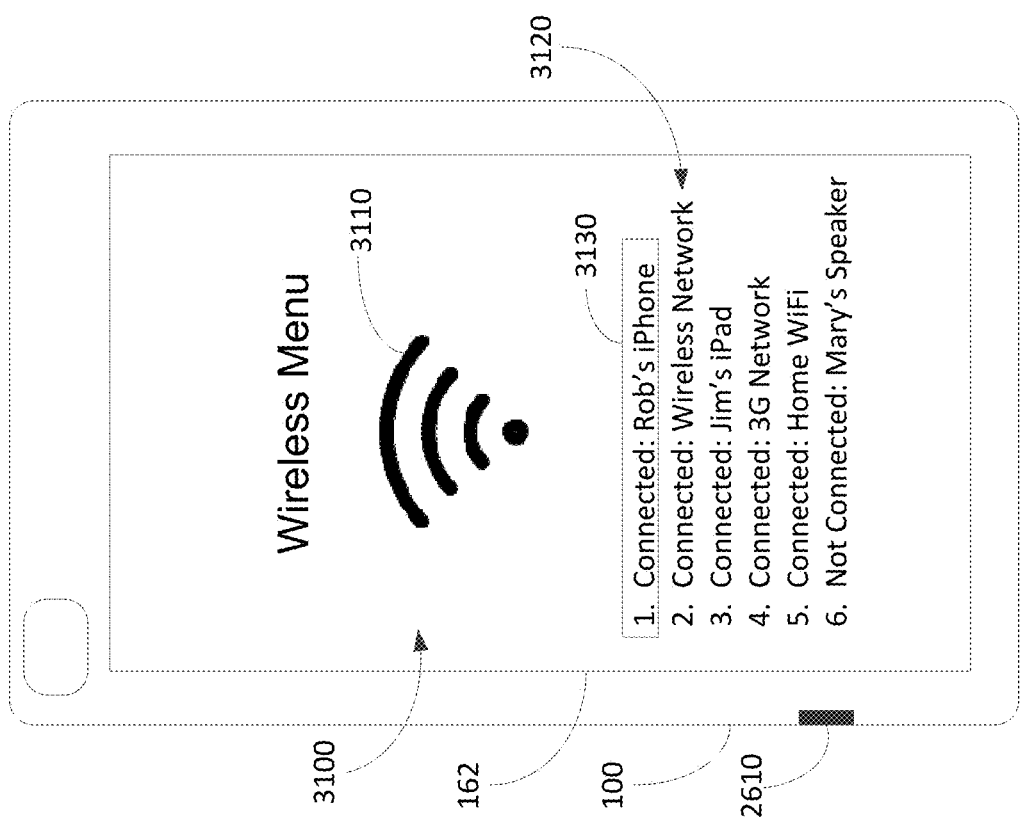
FIG. 31 shows an exemplary wireless menu displayed on a mobile device cover according to an embodiment of the present disclosure.

If the button 2610 is initially held down long enough (e.g., between 6.00 and 7.99 seconds), an exemplary wireless menu 3100 and corresponding wireless icon 3110 are displayed on the mobile device cover 100 along with the current state 3120 of any wireless links as shown in FIG. 31. By releasing or clicking the button 2610, the current state of a wireless link can be changed. For example, the wireless menu 3100 may indicate that a Bluetooth link, for example, exists between the mobile device cover 100 and the host mobile device 110. By releasing or clicking the button 2610, a Bluetooth link can be broken and the current status of that Bluetooth link can be displayed on the mobile device cover 100. In some embodiments, the Bluetooth link is broken by turning off the Bluetooth transceiver of the mobile device cover 100. In some embodiments, the wireless menu 3100 provides additional devices and/or networks that can be wirelessly connected or disconnected with the mobile device cover 100. For example, by clicking the button 2610, a user can select 3130 different options in a menu of communication options 3120, and by holding down the button for a preset duration, the mobile device cover 100 can effect a cellular link with a cellular communication system, a WiFi link with a wireless local area network, a Bluetooth link with a different Bluetooth-enabled device, an adhoc wireless link with another device (e.g., a wireless printer, a wireless speaker, etc.), etc. The mobile device cover 100 can include, for example, one or more antennas, one or more wireless transceivers, and other communication hardware or software for communicating over different types of communication links. The wireless menu 3100 can time out after a particular duration of inactivity or after a button press and hold for a preset duration.

If the button 2610 is initially held down long enough (e.g., between 8.00 and 9.99 seconds), an exemplary power menu 3200 is displayed on the mobile device cover 100 along with a power icon 3210 as shown in FIG. 31. By releasing or clicking the button 2610, the power state is toggled to the off state, the change in status is displayed 3220 (e.g., powering off, powering down, a countdown to powering down, etc.), and the mobile device cover 100 is powered down after a preset duration. After the mobile device cover 100 is turned off, a clicking or holding for a preset duration of the button 2610 changes the power state to the on state which is displayed (e.g., "powering on").

Other embodiments of the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A mobile phone cover for use with a mobile phone, comprising:
    a display;
    a user input interface;
    one or more processors operatively coupled to the display and the user input interface, wherein the one or more processors are operable to:
    provide a graphical user interface of the mobile phone cover that configures functionality of the mobile phone cover, wherein the functionality of the mobile phone cover can also be configured by a graphical user interface of the mobile phone, wherein the functionality comprises providing notifications based on a type of communication received by the mobile phone, a communication from a particular contact received by the mobile phone, and a communication received from the mobile phone relating to a particular mobile application; and
    receive input from the user input interface to access and configure the functionality of the mobile phone cover.

2. The mobile phone cover according to claim 1, wherein the user input interface comprises one or more buttons.

3. The mobile phone cover according to claim 1,
    wherein the type of communication received by the mobile phone comprises phone calls, emails, and text messages, and
    wherein the communication from the particular contact received by the mobile phone comprises a phone call, an email, and a text message from the particular contact.

4. The mobile phone cover according to claim 1, wherein communication received from the mobile phone relating to the particular mobile application comprises a communication received by the mobile phone from a social media application.

5. The mobile phone cover according to claim 1, wherein the functionality comprises the mobile phone cover charging the mobile phone based on the input from the user input interface, and displaying a status of a battery of the mobile phone cover or the mobile phone based on the input from the user input interface.

6. The mobile phone cover according to claim 1, wherein the functionality comprises displaying recent notifications and reviewing a particular notification of the recent notifications in additional detail based on the input from the user input interface.

7. The mobile phone cover according to claim 1, wherein the functionality comprises configuring the display of the notifications on an operating mobile phone cover based on the input from the user input interface.

8. The mobile phone cover according to claim 1, wherein the functionality comprises configuring one or more wireless communication links with the mobile phone cover based on the input from the user input interface.

9. The mobile phone cover according to claim 1, wherein the one or more processors are operable to:
    provide a graphical user interface to a provide a plurality of menus through which are navigated duration-based input from the user input interface where a particular time range corresponds to a particular menu, wherein each menu corresponds to a unique time range.

10. The mobile phone cover according to claim 1, wherein a first time range corresponds to a first menu, a second time range corresponds to a second menu, and the first time range and the second time range do not overlap in time.

11. The mobile phone cover according to claim 1, wherein the plurality of menus are displayed successively on the display when the user input interface is interacted with for at least a preset duration.

12. The mobile phone cover according to claim 1, wherein the mobile phone cover is a separate device from the mobile phone.

13. The mobile phone cover according to claim 1, wherein the mobile phone cover communicates wirelessly with the mobile phone.

14. The mobile phone cover according to claim 1, wherein the mobile phone cover communicates wirelessly with the mobile phone cover when the mobile phone cover is separated from the mobile phone.

15. The mobile phone cover according to claim 1, wherein the mobile phone cover comprises one or more cellular transceivers and is operable to communicate via a wireless cellular link.

16. The mobile phone cover according to claim 1, wherein the mobile phone cover is a separate device from the mobile phone and is structured to receive the mobile phone, and wherein the received mobile phone is connected to the mobile phone cover via a USB-type connector.

* * * * *